(12) United States Patent
Sakurai et al.

(10) Patent No.: US 6,850,278 B1
(45) Date of Patent: Feb. 1, 2005

(54) SOLID-STATE IMAGE PICKUP APPARATUS

(75) Inventors: Katsuhito Sakurai, Machida (JP); Shigetoshi Sugawa, Atsugi (JP); Hideyuki Arai, Kawasaki (JP); Isamu Ueno, Hadano (JP); Katsuhisa Ogawa, Machida (JP); Toru Koizumi, Yokohama (JP); Tetsunobu Kochi, Hiratsuka (JP); Hiroki Hiyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/449,679

(22) Filed: Nov. 24, 1999

(30) Foreign Application Priority Data

Nov. 27, 1998 (JP) ............................................ 10-337611
Nov. 27, 1998 (JP) ............................................ 10-337612

(51) Int. Cl.$^7$ .......................... H04N 3/14; H04N 5/335; H04N 5/217; H01L 27/00
(52) U.S. Cl. ........................ 348/302; 348/308; 348/241; 250/208.1; 250/370.99
(58) Field of Search ................................. 348/241, 308, 348/302; 250/208.1, 370.99, 370.09

(56) References Cited

U.S. PATENT DOCUMENTS

| 4,709,147 | A |   | 11/1987 | Arai ............................ 250/234 |
| 4,737,854 | A |   | 4/1988  | Tandon et al. .......... 358/213.31 |
| 4,835,404 | A |   | 5/1989  | Sugawa et al. .............. 250/578 |
| 4,879,470 | A |   | 11/1989 | Sugawa et al. .............. 250/578 |
| 4,967,067 | A |   | 10/1990 | Hashimoto et al. ....... 250/208.1 |
| 4,972,243 | A |   | 11/1990 | Sugawa et al. ................ 357/30 |
| 5,162,912 | A |   | 11/1992 | Ueno et al. ............. 358/213.16 |
| 5,172,249 | A | * | 12/1992 | Hashimoto ................... 358/482 |
| 5,184,006 | A |   | 2/1993  | Ueno ........................ 250/208.1 |
| RE34,309  | E |   | 7/1993  | Tanaka et al. .......... 358/213.31 |
| 5,262,870 | A |   | 11/1993 | Nakamura et al. ........... 358/212 |
| 5,539,196 | A |   | 7/1996  | Miyawaki et al. ........ 250/208.1 |
| 5,693,932 | A |   | 12/1997 | Ueno et al. ............... 250/208.1 |
| 5,714,752 | A |   | 2/1998  | Ueno et al. ............... 250/208.1 |
| 5,818,052 | A | * | 10/1998 | Elabd ..................... 250/370.09 |
| 5,861,917 | A |   | 1/1999  | Tariki et al. ................. 348/230 |
| 5,990,471 | A | * | 11/1999 | Watanabe ................. 250/208.1 |
| 6,002,287 | A |   | 12/1999 | Ueno et al. .................. 327/307 |
| 6,011,251 | A | * | 1/2000  | Dierickx et al. .......... 250/208.1 |
| 6,133,862 | A | * | 10/2000 | Dhuse et al. ................ 341/118 |
| 6,243,134 | B1 | * | 6/2001  | Beiley ......................... 348/308 |
| 6,317,154 | B2 | * | 11/2001 | Beiley ......................... 348/308 |
| 6,512,546 | B1 | * | 1/2003  | Decker et al. .............. 348/308 |
| 6,538,693 | B1 | * | 3/2003  | Kozuka ....................... 348/241 |
| 6,587,146 | B1 | * | 7/2003  | Guidash ...................... 348/308 |
| 2001/0007471 | A1 | * | 7/2001 | Beiley ......................... 348/241 |
| 2002/0154231 | A1 | * | 10/2002 | Decker et al. .............. 348/302 |

FOREIGN PATENT DOCUMENTS

JP              7-105915         2/1988

* cited by examiner

Primary Examiner—Wendy R. Garber
Assistant Examiner—James M. Hannett
(74) Attorney, Agent, or Firm—Fitzpatrick, Cella, Harper & Scinto

(57) ABSTRACT

This invention is to provide a solid-state image pickup apparatus including a photoelectric conversion unit (PD), transfer switch (MTX) for transferring signal charges from the photoelectric conversion unit, capacitance for holding the transferred signal charges, and amplification transistor (MSF) for outputting a signal corresponding to the signal charges held by the capacitance. The amplification transistor includes a capacitance unit (CFD) having the first capacitance value and an additive capacitance unit (Cox) for adding a capacitance to the capacitance unit to increase the first capacitance value and obtain the second capacitance value. A signal read-out from the amplification transistor has a first read-out mode in which a signal is read out while keeping the signal charges held by the capacitance unit and additive capacitance unit, and a second read-out mode in which a signal is read out while keeping the signal charges held by the capacitance unit.

35 Claims, 35 Drawing Sheets

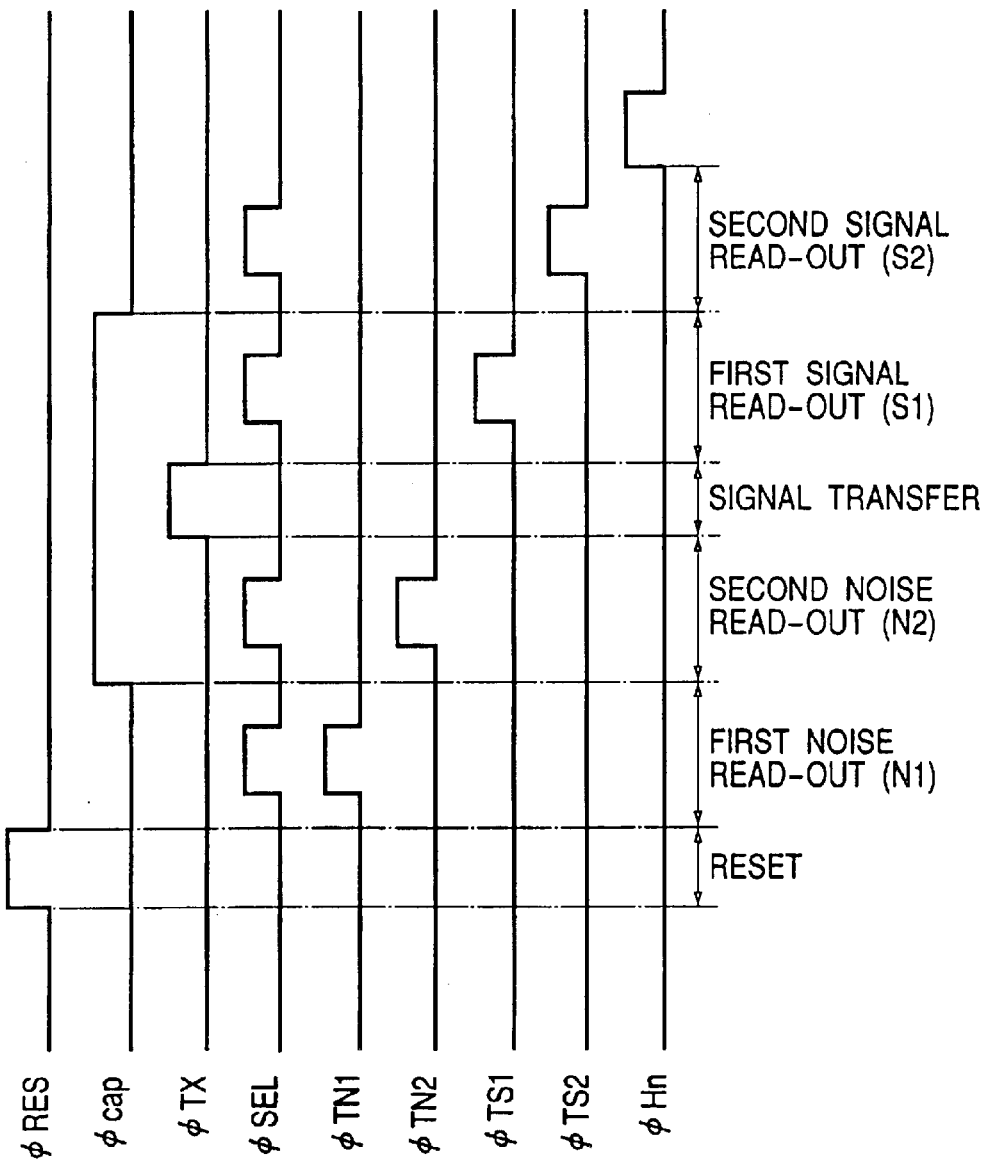

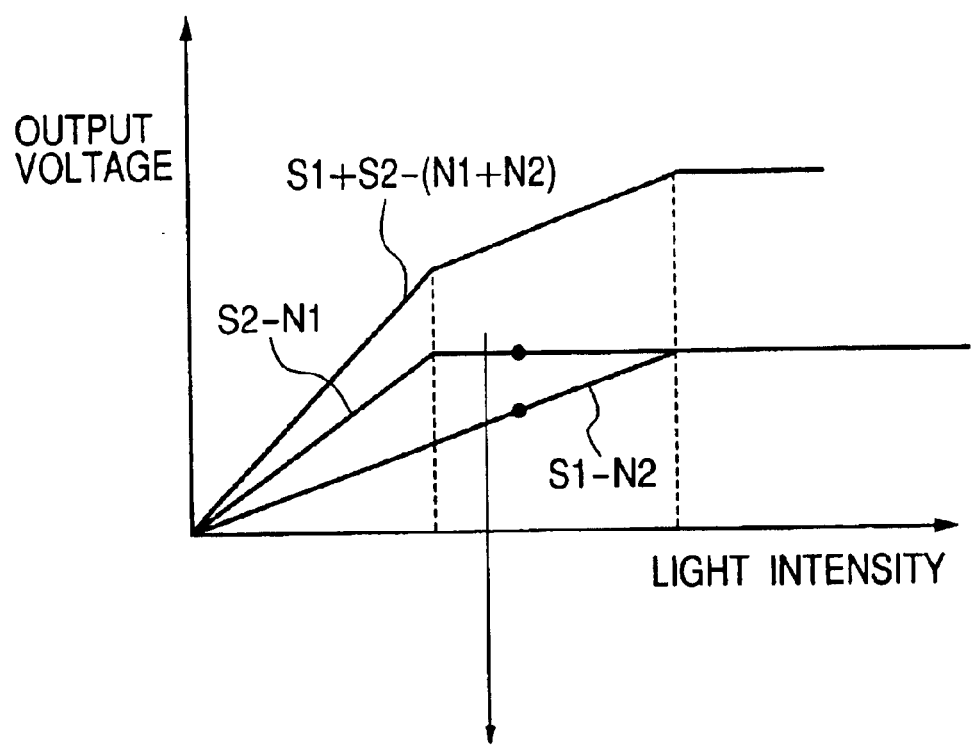

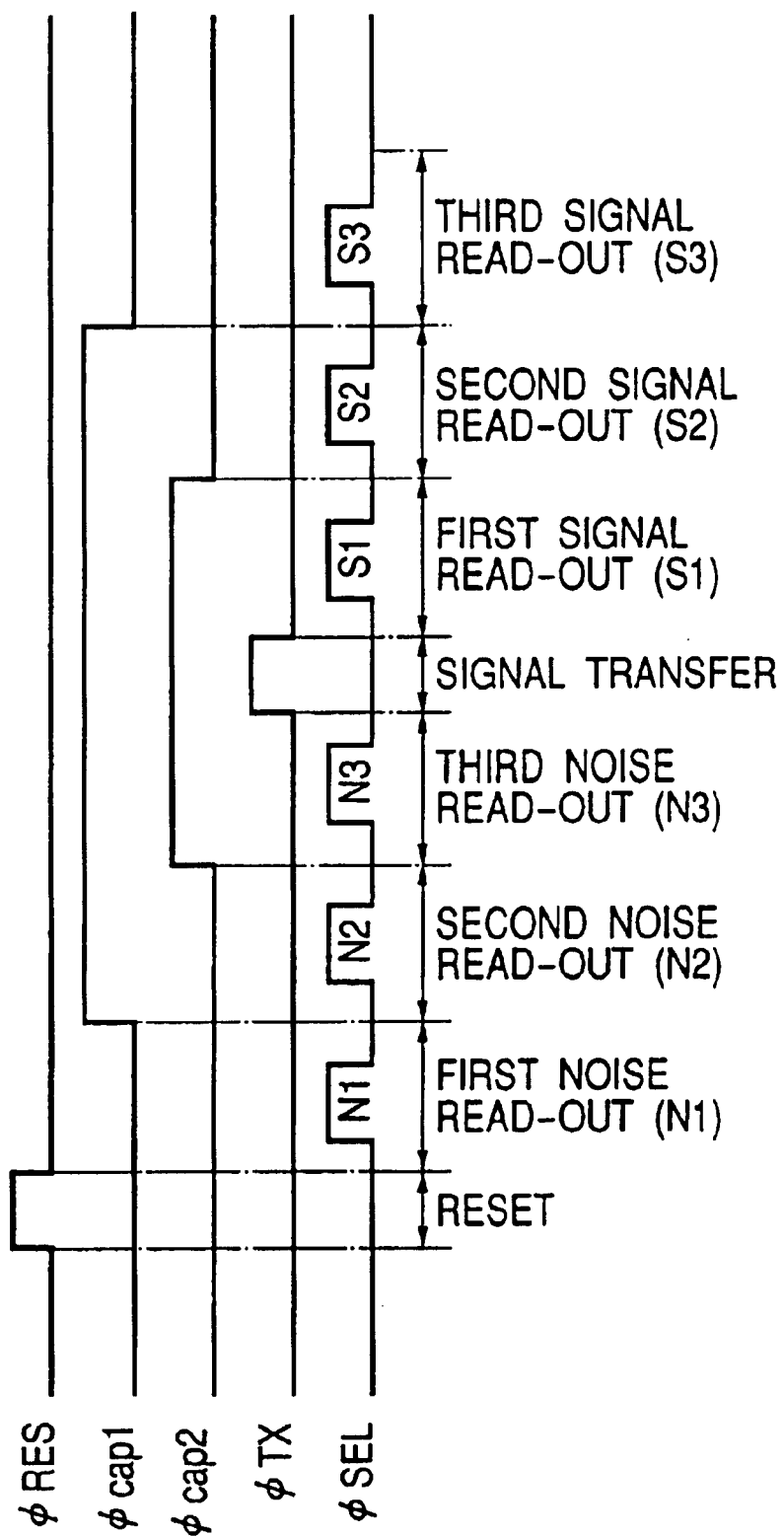

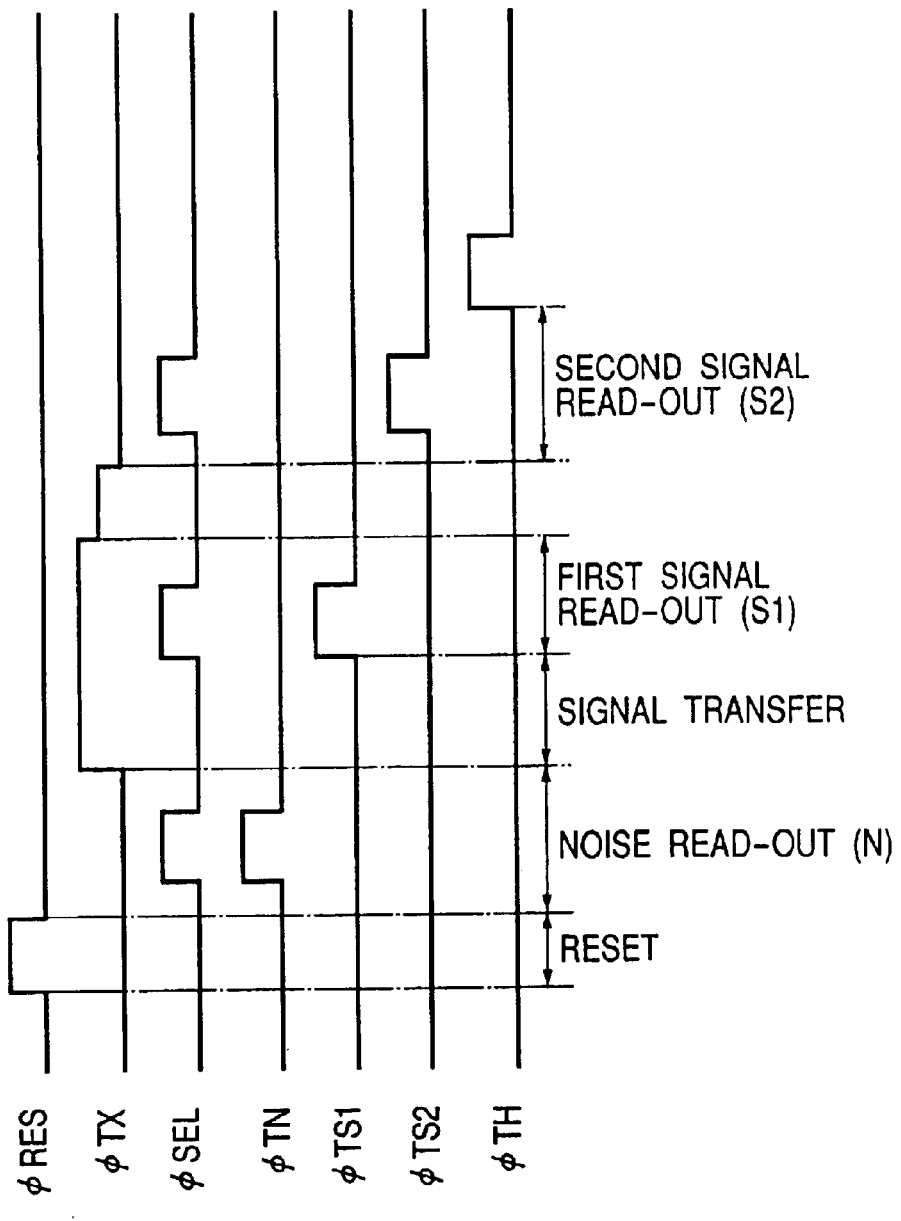

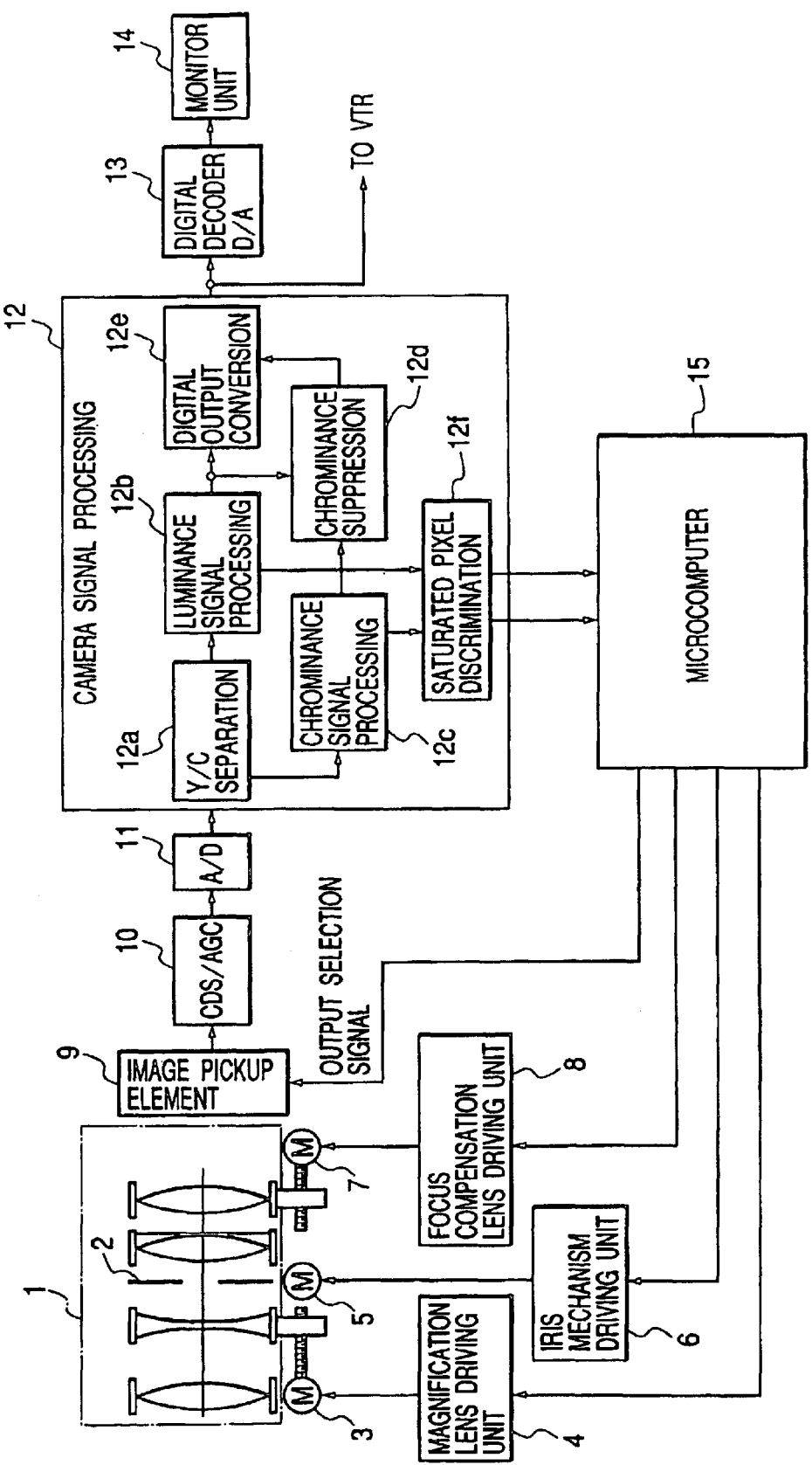

SOLID-STATE IMAGE PICKUP APPARATUS

BACKGROUND OF THE INVENTION

1. Field of the Invention

The present invention relates to a solid-state image pickup apparatus having a photoelectric conversion function.

2. Related Background Art

Conventionally, a conventional solid-state image pickup apparatus extends the dynamic range by, e.g., reading out two kinds of signals with different accumulation periods from one pixel and combining the two kinds of signals, i.e., combining a signal having high sensitivity but narrow dynamic range with a signal having low sensitivity but wide dynamic range.

In this method, after signal charges are accumulated in a given accumulation period, signal charges must be accumulated again in another accumulation period. For this reason, image signals with different accumulation periods are obtained.

SUMMARY OF THE INVENTION

It is an object of the present invention to provide a solid-state image pickup apparatus capable of extending the dynamic range and a signal read-out method for the solid-state image pickup apparatus.

In order to achieve the above object, according to an aspect of the present invention, there is provided a solid-state image pickup apparatus comprising:

a photoelectric conversion unit;

transfer means for transferring signal charges from the photoelectric conversion unit;

capacitance means for holding the transferred signal charges; and amplification means for outputting a signal corresponding to the signal charges held by the capacitance means, wherein the capacitance means having a capacitance unit includes a first capacitance value and an additive capacitance unit for adding a capacitance to the capacitance unit to increase the first capacitance value to obtain a second capacitance value, and wherein a signal read-out from the amplification means has a first read-out mode in which a signal is read out while holding the signal charges in the capacitance unit and the additive capacitance unit, and a second read-out mode in which a signal is read out while holding the signal charges in the capacitance unit.

According to another aspect, there is provided a signal read-out method for a solid-state image pickup apparatus which holds, in capacitance means, signal charges generated by a photoelectric conversion unit and outputs a signal corresponding to the signal charges held by the capacitance means from amplification means, comprising:

a first read-out mode in which a signal is output from the amplification means while holding the signal charges generated by the photoelectric conversion unit in the capacitance means set at a first capacitance value, and a second read-out mode in which, after the first read-out mode, the capacitance value of the capacitance means is changed from the first capacitance value to a second capacitance value, and a signal corresponding to the signal charges held by the capacitance means set at the second capacitance value is output from the capacitance means.

According to still another aspect, there is provided a solid-state image pickup apparatus comprising:

a photoelectric conversion unit; and a charge/voltage conversion unit for converting signal charges transferred from the photoelectric conversion unit into a signal voltage, wherein the charge/voltage conversion unit comprises a plurality of capacitances having different dependences on voltage.

According to still another aspect, there is provided a solid-state image pickup apparatus including a plurality of pixels, each pixel comprising:

a photoelectric conversion unit;

holding means for holding a signal from the photoelectric conversion unit;

read-out means for reading out the signal held by the holding means; and capacitance changing means for changing a capacitance value of the holding means.

According to still another aspect, there is provided a solid-state image pickup apparatus including a plurality of pixels, each pixel comprising:

a photoelectric conversion unit;

a charge/voltage conversion unit for generating a voltage corresponding to a charge amount of the signal charges from the photoelectric conversion unit;

control means for controlling to change a charge/voltage conversion efficiency of the charge/voltage conversion unit in accordance with the charge amount of the signal charges; and read-out means for reading out the voltage generated by the charge/voltage conversion unit to an output line.

According to still another aspect, there is provided a solid-state image pickup apparatus including a plurality of pixels, each pixel comprising:

a photoelectric conversion unit;

a charge/voltage conversion unit for generating a voltage corresponding to a charge amount of the signal charges from the photoelectric conversion unit; and read-out means for reading out the voltage generated by the charge/voltage conversion unit to an output line, wherein a charge/voltage conversion efficiency of the charge/voltage conversion unit changes in accordance with the charge amount of the signal charges.

The above and other objects, features, and advantages of the present invention will be apparent from the following detailed description in conjunction with the accompanying drawings.

BRIEF DESCRIPTION OF THE DRAWINGS

FIG. 2 is a timing chart showing the operation of the solid-state image pickup apparatus shown in FIG. 1;

FIG. 3 is a graph showing the photoelectric conversion characteristics of the solid-state image pickup apparatus shown in FIG. 1;

FIG. 7 is a timing chart showing the operation of the solid-state image pickup apparatus shown in FIG. 6;

FIG. 10 is a timing chart showing the operation of the solid-state image pickup apparatus shown in FIG. 9;

FIG. 48 is a block diagram showing a video camera apparatus according to the present invention.

DESCRIPTION OF THE PREFERRED EMBODIMENTS

Embodiments of the present invention will be described below with reference to the accompanying drawings.

Figure 1:
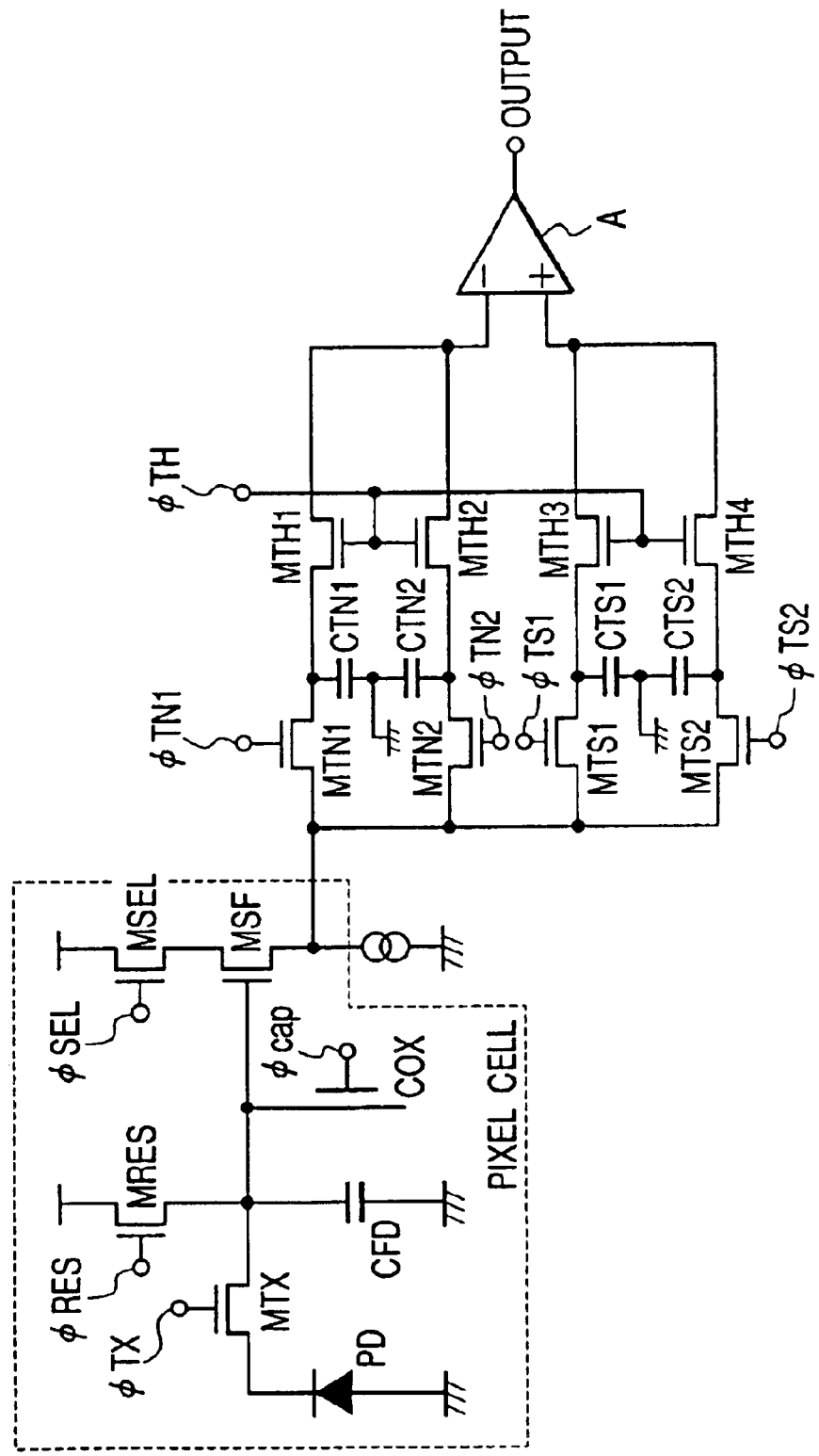
FIG. 1 is a schematic view showing a solid-state image pickup apparatus.

FIG. 1 is a schematic view showing a solid-state image pickup apparatus according to the first embodiment of the present invention.

Referring to FIG. 1, one pixel cell is constructed by a photodiode PD, transfer switch MTX, reset switch MRES, selection switch MSEL, amplification means MSF, capacitance CFD, and MOS inverted capacitance Cox. The capacitance CFD is the capacitance of a floating diffusion to which signal charges are transferred and is constituted by a parasitic capacitance generated by a MOS source-drain junction capacitance or line capacitance. The MOS inverted capacitance Cox is generated by a voltage applied to the gate and added to the capacitance CFD as needed. Each of the switches and amplification means is constructed by a MOS transistor. This pixel is used for an area sensor and therefore has the selection switch MSEL. A line sensor need not have the selection switch MSEL.

The amplification means MSF is connected to capacitances CTN1, CTN2, CTS1, and CTS2 through change-over switches MTN1, MTN2, MTS1, and MTS2. The capacitances CTN1 and CTN2 are connected to the inverting input terminal (−) of a differential amplifier A through common output means MTH1 and MTH2. The capacitances CTS1 and CTS2 are connected to the noninverting input terminal (+) of the differential amplifier A through common output means MTH3 and MTH4. Signals φTX, φRES, φSEL, φTN1, φTN2, φTS1, and φTS2 control the transfer switch MTX, reset switch MRES, selection switch MSEL, and switching means MTN1, MTN2, MTS1, and MTS2, respectively. A control signal φcap forms the MOS inverted capacitance Cox. A signal φTH controls the common output means MTH1, MTH2, MTH3, and MTH4.

The operation of the solid-state image pickup apparatus will be described next with reference to the timing chart in FIG. 2.

First, the signal φRES is set at high level to turn on the reset switch MRES and reset the gate of the amplification means MSF. The capacitance Cox is not added because the signal φcap is at low level. The capacitance CFD is added to the gate of the amplification means. In this state, the signals φSEL and φTN1 are set at high level to turn on the selection switch MSEL and change-over switch MTN1. A noise signal N1 after reset is read out from the amplification means MSF and accumulated in the capacitance CTN1 (first noise read-out).

Next, the signal φcap is set at high level to add the capacitance Cox to the capacitance CFD. In this state, the signals φSEL and φTN2 are set at high level to turn on the selection switch MSEL and change-over switch MTN2. A noise signal N2 is read out from the amplification means MSF and accumulated in the capacitance CTN2 (second noise read-out). With this operation, noise signals are read out and accumulated while adding different capacitances to the gate of the amplification means MSF.

After that, the signal φTX is set at high level to transfer signal charges from the photodiode PD. While keeping the signal φcap at high level and the capacitance Cox added to the capacitance CFD, the signals φSEL and φTS1 are set at high level to turn on the selection switch MSEL and change-over switch MTS1. A sensor signal S1 containing the noise signal N2 is read out from the amplification means MSF and accumulated in the capacitance CTS1 (first signal read-out). The signal φcap is set at low level to remove the capacitance Cox while keeping the capacitance CFD added to the gate of the amplification means MSF. In this state, the signals φSEL and φTS2 are set at high level to turn on the selection switch MSEL and change-over switch MTS2. A sensor signal S2 containing the noise signal N1 is read out from the amplification means MSF and accumulated in the capacitance CTS2 (second signal read-out). With this operation, two sensor signals having different dynamic ranges can be obtained on the basis of signals charges accumulated in the same accumulation period.

Next, the signal φTH is set at high level to read out the sum of the noise signals N1 and N2 from the capacitances CTN1 and CTN2 through the common line and read out the sum of the sensor signals S1 and S2 from the capacitances CTS1 and CTS2 through the common line. The differential amplifier calculates (S1+S2)−(N1+N2). A resultant signal exhibits photoelectric conversion characteristics shown in FIG. 3. As shown in FIG. 3, the output (S1+S2)−(N1+N2) corresponds to the sum of a signal (S1−N2) and a signal (S2−N1).

The above-described read-out operation will be described with reference to the potential charts in FIGS. 4A to 4D.

Figure 4A:
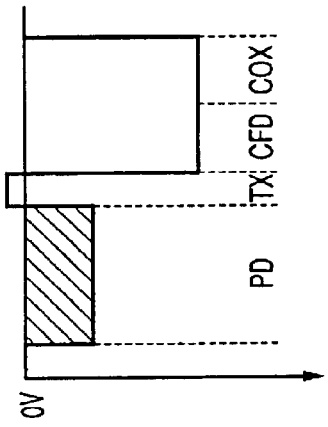
FIGS. 4A, 4B, 4C and 4D are potential charts showing the read-out operation of the solid-state image pickup apparatus shown in FIG. 1.
Figure 4B:
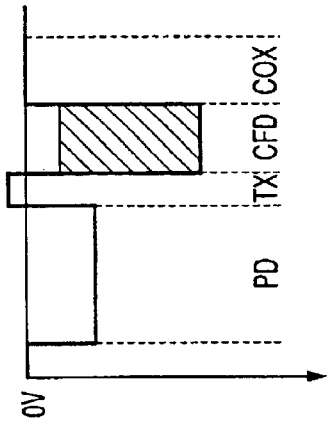
Figure 4C:
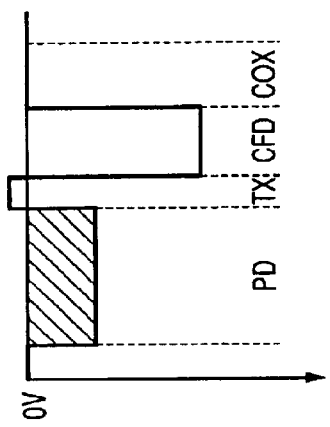
Figure 4D:
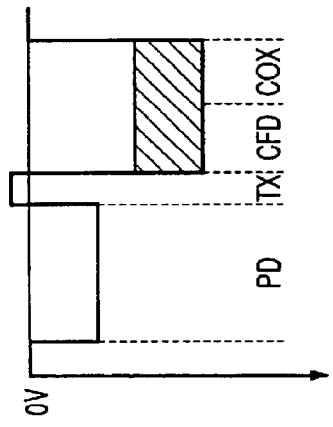

FIG. 4A is a potential chart in the first noise read-out. The noise (N1) is read out while adding the capacitance CFD without the capacitance Cox. Since the transfer switch is OFF, and the barrier is high, the signal charges are accumulated in the photodiode PD. FIG. 4B is a potential chart in the second noise read-out. The noise (N2) is read out while forming the capacitance Cox and adding it to the capacitance CFD. FIG. 4C is a potential chart in the first signal read-out. At this time, the transfer switch is turned on to transfer the signal charges from the photodiode PD to the capacitances CFD and Cox. The sensor signal (S1) is read out while accumulating the signal charges in the capacitances CFD and Cox. FIG. 4D is a potential chart in the second signal read-out. At this time, the capacitance Cox disappears, and the signal charges are transferred and accumulated in the capacitance CFD. In this state, the sensor signal (S2) is read out. With this operation, the first and second noise signals and first and second sensor signals are read out on the basis of the different capacitances.

Figure 5:
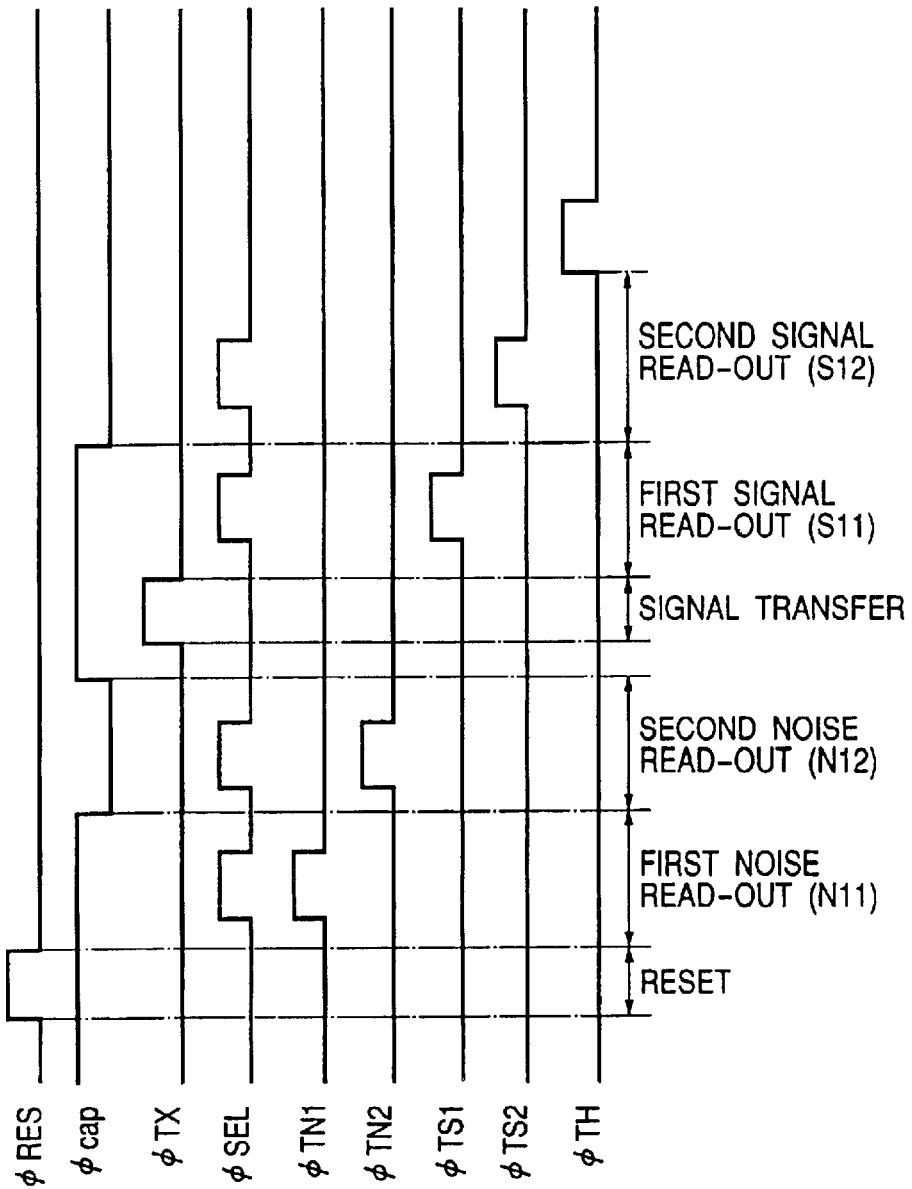
FIG. 5 is a timing chart showing another signal read-out method for the solid-state image pickup apparatus.

FIG. 5 is a timing chart showing another signal read-out method of the present invention. As shown in FIG. 5, first, the gate is reset while keeping the signal φcap at high level. A noise signal N11 is read out from the amplification means MSF while keeping the signal φcap at high level to add the capacitance Cox to the capacitance CFD. Next, the signal φcap is set at low level to remove the capacitance Cox. A noise signal N12 is read out from the amplification means MSF without adding the capacitance Cox to the capacitance CFD at the gate of the amplification means MSF.

After that, the signal φcap is set at high level to add the capacitance Cox to the capacitance CFD. In this state, a sensor signal S11 containing the noise signal N11 is read out from the amplification means MSF. Next, the signal φcap is set at low level to remove the capacitance Cox. A sensor signal S12 containing the noise signal N12 is read out from the amplification means MSF without adding the capacitance Cox to the capacitance CFD.

This signal read-out method is different from that shown in FIG. 2 in that after the noise is read out while adding the capacitance Cox, the noise is read out without adding the capacitance Cox. In this method, the signal φcap changes from high level to low level in both the noise read-out period and the signal read-out period. For this reason, the influence of characteristics due to the level change in the signal φcap can be constant. The influence of the level change in signal φcap can be eliminated by calculating (S1+S2)−(N1+N2).

In the first embodiment, one MOS inverted capacitance is prepared as the additive capacitance unit. However, a plurality of MOS inverted capacitances may be used.

Figure 6:
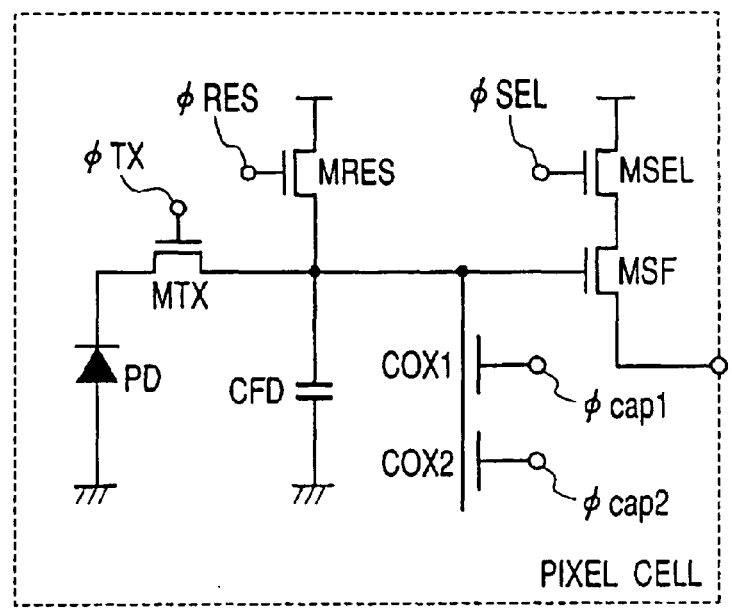
FIG. 6 is a schematic view showing a pixel of another solid-state image pickup apparatus.
Figure 8:
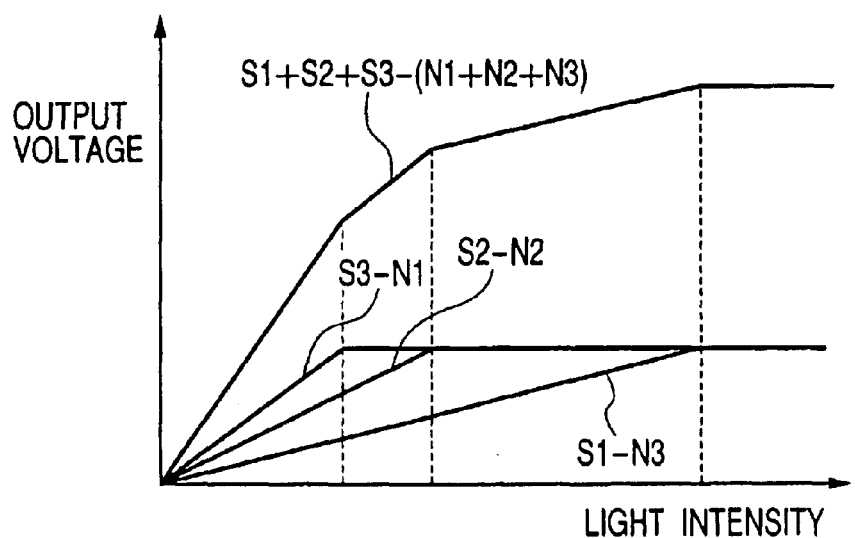
FIG. 8 is a graph showing the photoelectric conversion characteristics of the solid-state image pickup apparatus shown in FIG. 6.

In the second embodiment, two MOS inverted capacitances are prepared. FIG. 6 is a schematic view showing a pixel of a solid-state image pickup apparatus according to the second embodiment of the present invention. FIG. 7 is a timing chart showing the operation of the apparatus. FIG. 8 is a graph showing the photoelectric conversion characteristics.

The pixel structure shown in FIG. 6 is different from that in FIG. 1 in that MOS inverted capacitances Cox1 and Cox2 are connected in parallel, and the capacitance Cox1 or/and capacitance Cox2 can be added to a capacitance CFD in accordance with signals φcap1 and φcap2. The remaining parts are the same as in FIG. 1.

As for the operation of this solid-state image pickup apparatus, first, a signal φRES is set at high level to turn on a reset switch MRES and reset the gate of an amplification means MSF, as shown in the timing chart of FIG. 7. The inverted capacitances Cox1 and Cox2 are not added because the signals φcap1 and φcap2 are at low level, and the capacitance CFD is added to the gate of the amplification means MSF. In this state, a signal φSEL is set at high level to turn on a selection switch MSEL and read out a noise signal N1 from the amplification means MSF (first noise read-out).

Next, the signal φcap1 is set at high level to add the inverted capacitance Cox1 to the capacitance CFD. In this state, the signal φSEL is set at high level to turn on the selection switch MSEL and read out a noise signal N2 from the amplification means MSF (second noise read-out). The signal φcap2 may be set at high level to add the capacitance Cox2 to the capacitance CFD.

After that, the signal φcap1 is kept at high level, and the signal φcap2 is set at high level to add the inverted capacitances Cox1 and Cox2 to the capacitance CFD. In this state, the signal φSEL is set at high level to turn on the selection switch MSEL and read out a noise signal N3 from the amplification means MSF (third noise read-out).

A signal φTX is set at high level to transfer signal charges from a photodiode PD. The signals φcap1 and φcap2 are kept at high level to add the inverted capacitances Cox1 and Cox2 to the capacitance CFD. In this state, the signal φSEL is set at high level to turn on the selection switch MSEL and read out a sensor signal S1 containing the noise signal N3 from the amplification means MSF (first signal read-out).

Next, the signal φcap2 is set at low level to remove the capacitance Cox2. While keeping the capacitance CFD and capacitance Cox1 added to the gate of the amplification means MSF, the signal φSEL is set at high level to turn on the selection switch MSEL and read out a sensor signal S2 containing the noise signal N2 from the amplification means MSF (second signal read-out).

The signal φcap2 is kept at low level, and the signal φcap1 is set at low level to remove the inverted capacitances Cox1 and Cox2 while adding the capacitance CFD to the gate of the amplification means MSF. In this state, the signal φSEL is set at high level to turn on the selection switch MSEL and read out a sensor signal S3 containing the noise signal N1 from the amplification means MSF (third signal read-out).

The readout noise signals N1 to N3 and sensor signals S1 to S3 are accumulated in corresponding capacitances. The noise signals N1 to N3 are added and input to the inverting input terminal (−) of the differential amplifier. The sensor signals S1 to S3 are added and input to the noninverting input terminal (+) of the differential amplifier. The differential amplifier calculates (S1+S2+S3)−(N1+N2+N3). A resultant signal exhibits photoelectric conversion characteristics shown in FIG. 8. As shown in FIG. 8, the output (S1+S2+S3)−(N1+N2+N3) corresponds to the sum of a signal (S1−N3), a signal (S2−N2), and a signal (S3−N1).

According to this embodiment, a sensor signal having a wider dynamic range can be obtained on the basis of signal charges accumulated in the same accumulation period.

Figure 20:
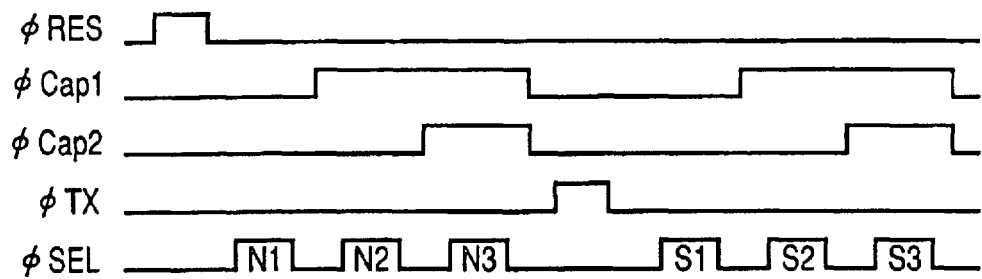
FIG. 20 is a timing chart showing the signal read-out method for the solid-state image pickup apparatus.

The same signal read-out method as that described in the first embodiment with reference to FIG. 5 can be used for this embodiment. FIG. 20 is a timing chart showing the signal read-out method. As shown in FIG. 20, the levels of the signals φcap1 and φcap2 are changed in the same direction (from low level to high level) in the noise read-out period and signal read-out period. For this reason, the influence of the characteristics due to the level change in signals φcap1 and φcap2 can be constant. The influence of the level change in signals φcap1 and φcap2 can be eliminated by calculating (S1+S2+S3)−(N1+N2+N3).

In the first and second embodiments, the inverted MOS capacitance is provided to add a capacitance to the capacitance CFD. However, the capacitance to be added to the capacitance CFD can be formed without preparing any element for adding the capacitance.

Figure 9:
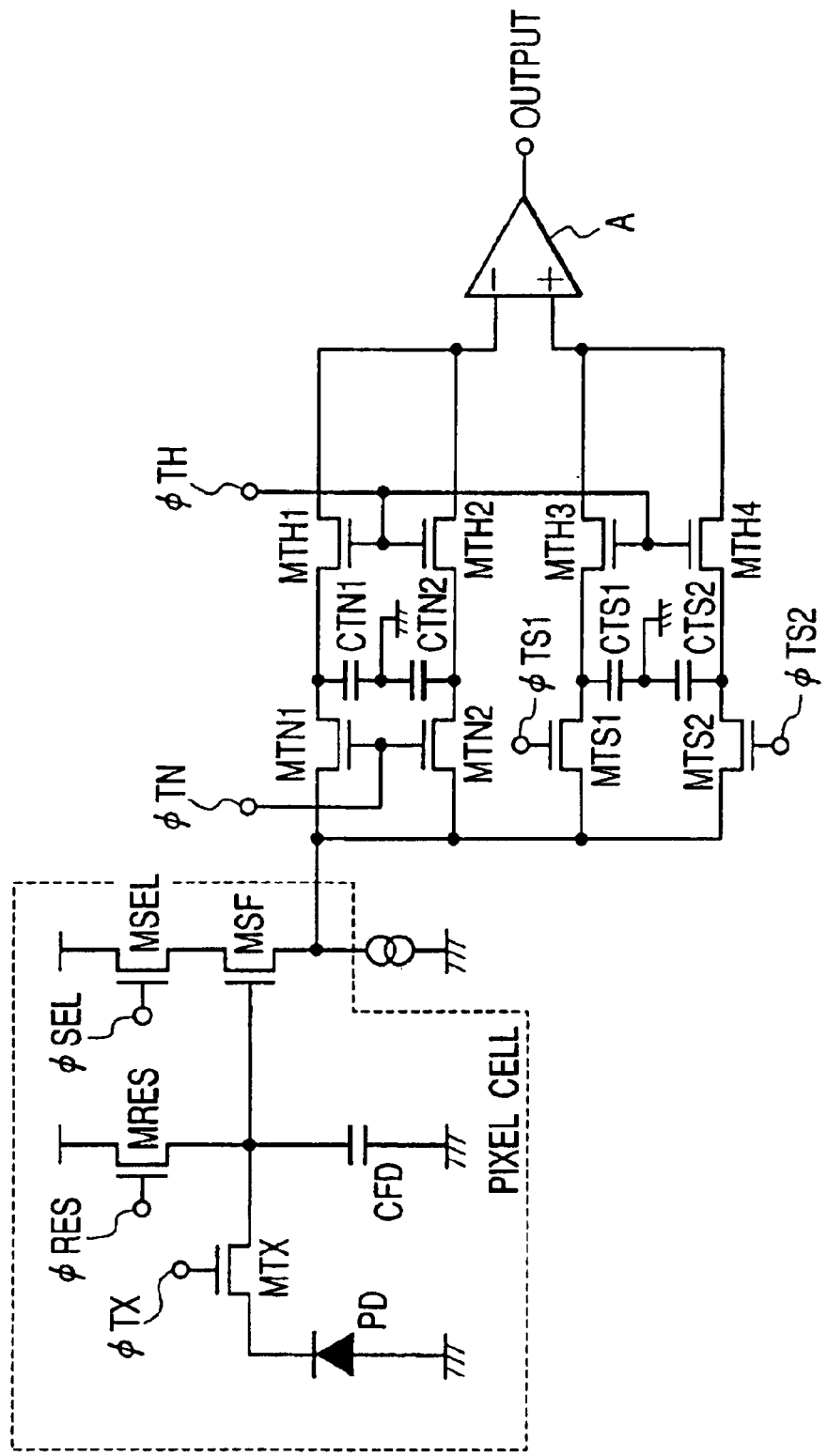
FIG. 9 is a schematic view showing still another solid-state image pickup apparatus.

In the third embodiment, the channel of a MOS transistor serving as a transfer switch is used as a capacitance. FIG. 9 is a schematic view showing a solid-state image pickup apparatus according to the third embodiment of the present invention. FIG. 10 is a timing chart showing the operation of the apparatus. FIGS. 11A to 11D are potential charts for explaining the operation of the apparatus.

The pixel structure shown in FIG. 9 is different from that in FIG. 1 in that the MOS inverted capacitance Cox is not arranged. In this embodiment, the channel of a MOS transistor MTX serving as a transfer switch is used as a capacitance.

The operation will be described with reference to FIGS. 10 and 11A to 11D.

Figure 11A:
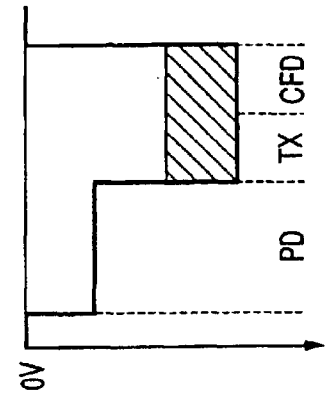
FIGS. 11A, 11B, 11C and 11D are potential charts for explaining the operation of the solid-state image pickup apparatus shown in FIG. 9.
Figure 11B:
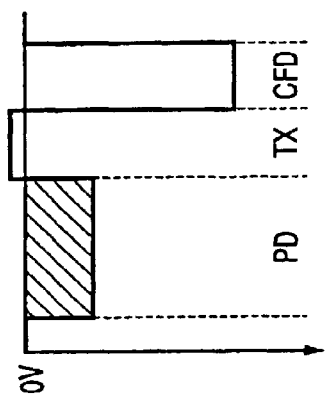
Figure 11C:
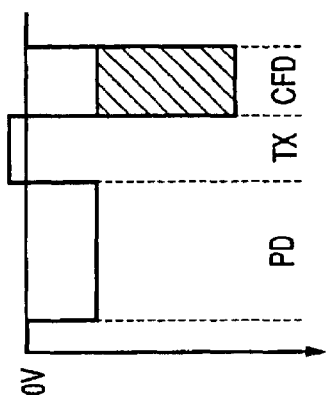
Figure 11D:
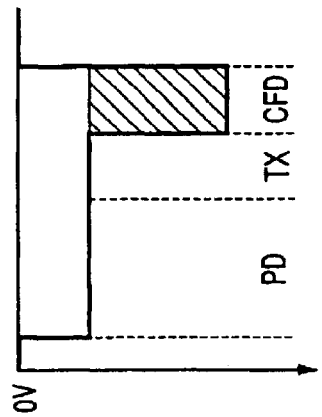

First, a signal φRES is set at high level to turn on a reset switch MRES and reset the gate of an amplification means MSF. After that, signals φSEL and φTN are set at high level to turn on a selection switch MSEL and change-over switches MTN1 and MTN2. A noise signal N is read out from the amplification means MSF and accumulated in capacitances CTN1 and CTN2 (noise read-out). FIG. 11A is a potential chart of this operation.

A signal φTX is set at high level to transfer signal charges from a photodiode PD. While keeping the signal φTX at high level, the signals φSEL and φTS1 are set at high level to turn on the selection switch MSEL and change-over switch MTS1. A sensor signal S1 containing the noise signal is read out from the amplification means MSF and accumulated in a capacitance CTS1. When the signal φTX is at high level, the channel of the MOS transistor MTX serving as a transfer switch functions as a capacitance (inverted capacitance). This capacitance is called a capacitance CTX. As shown in the potential chart of FIG. 11B, the capacitance CTX is added to a capacitance CFD. The sensor signal S1 is read out while keeping the signal charges accumulated in both capacitances.

To remove the capacitance CTX, the level of the signal φTX is lowered. At this time, the signal φTX is temporarily set at middle level to prevent the signal charges from flowing to the photodiode PD side and transfer all charges to the capacitance CFD side. In the potential chart of FIG. 11C, the signal φTX is set at middle level to transfer all charges to the capacitance CFD side.

The signal φTX is changed from middle level to low level. While keeping the signal charges accumulated in the capacitance CFD, the signals φSEL and φTS2 are set at high level to turn on the selection switch MSEL and change-over switch MTS2. A sensor signal S2 containing the noise signal is read out from the amplification means MSF and accumulated in the capacitance CTS2. In the potential chart of FIG. 11D, the signal φTX is set at low level, and all charges are accumulated on the capacitance CFD side.

Next, the signal φTH is set at high level to read out the sum of the noise signals N from the capacitances CTN1 and CTN2 through the common line and the sum of the sensor signals S1 and S2 from the capacitances CTS1 and CTS2 through the common line. The differential amplifier calculates (S1+S1)−(2N).

According to this embodiment, a simpler pixel structure can be realized.

In the first and second embodiments, the inverted MOS capacitance is provided to add a capacitance to the capacitance CFD. Two transfer switches may be provided, and a capacitance may be formed between the first transfer switch and the second transfer switch as an additive capacitance.

Figure 12:
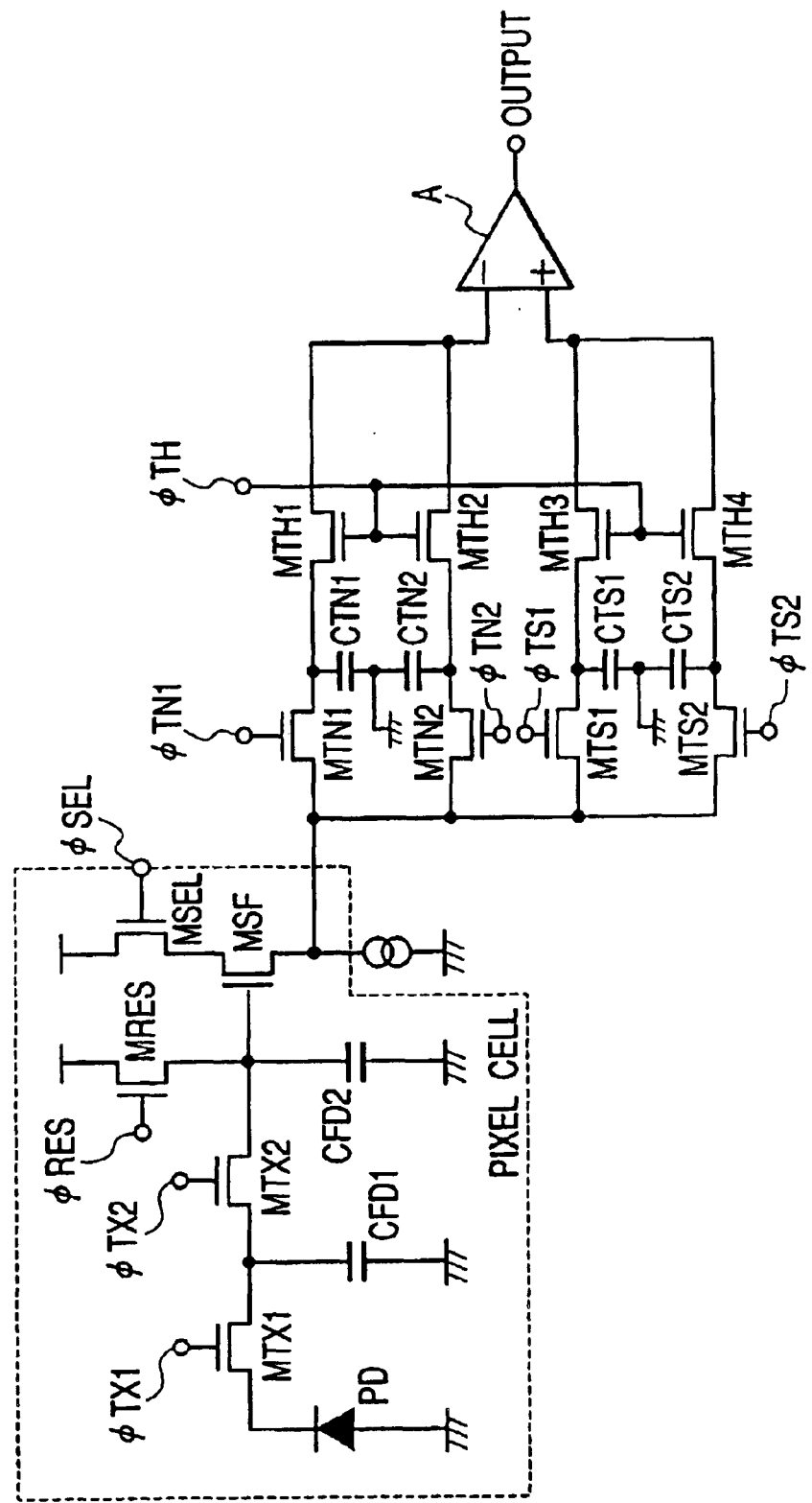
FIG. 12 is a schematic view showing still another solid-state image pickup apparatus.
Figure 13:
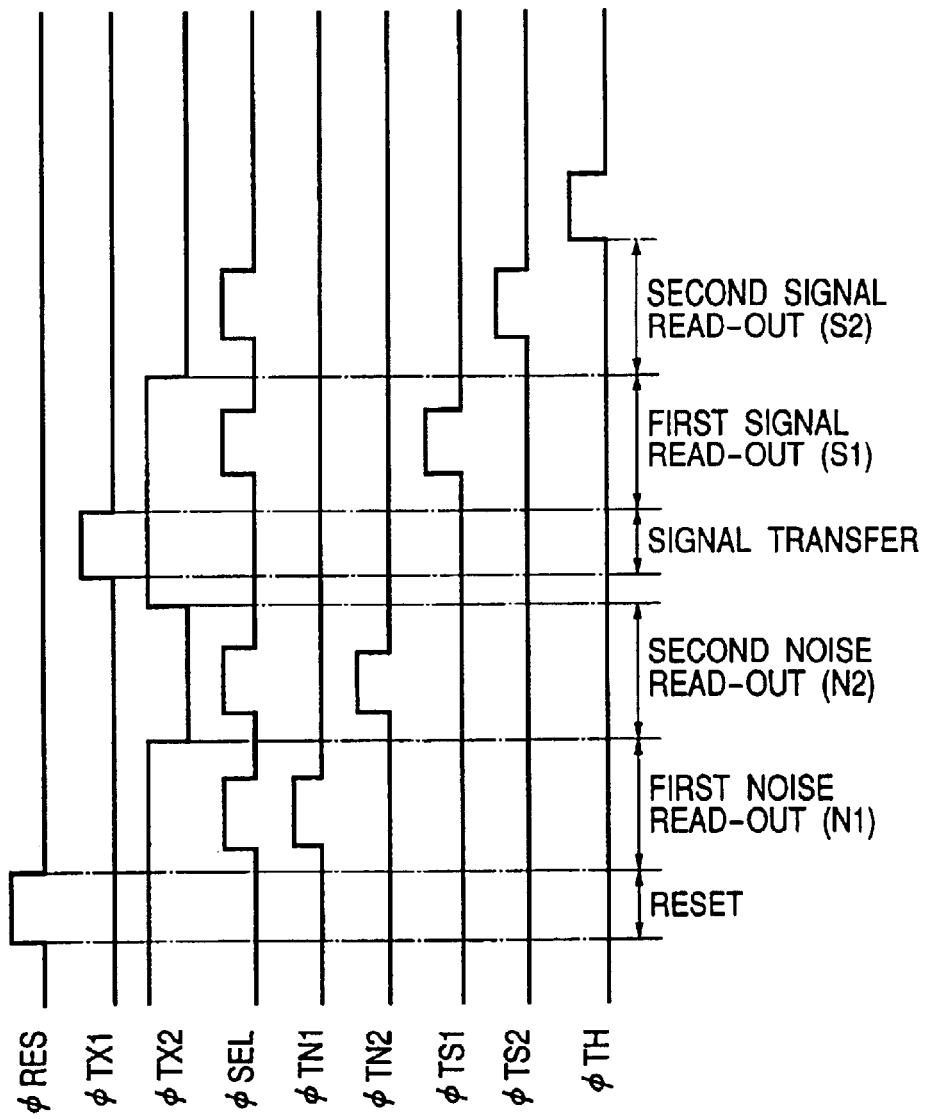
FIG. 13 is a timing chart showing the operation of the solid-state image pickup apparatus shown in FIG. 12.

In the fourth embodiment, two transfer switches are prepared, and an additive capacitance is formed therebetween. The number of transfer switches is not limited to two. Three or more transfer switches may be provided (two or more additive capacitances are formed accordingly). FIG. 12 is a schematic view showing a solid-state image pickup apparatus according to the fourth embodiment of the present invention. FIG. 13 is a timing chart showing the operation of the apparatus.

The pixel structure shown in FIG. 12 is different from that in FIG. 1 in that two MOS transistors MTX1 and MTX2 are prepared as transfer switches, a capacitance CFD1 is formed between the MOS transistor MTX1 and MOS transistor MTX2. The capacitance added to the gate of an amplification means MSF is switched between a capacitance CFD2 and a capacitance (CFD1+CFD2) by controlling signals φTX1 and φTX2. The remaining parts are the same as those of the pixel structure shown in FIG. 1.

The operation of this solid-state image pickup apparatus will be described next with reference to the timing chart in FIG. 13.

First, a signal φRES is set at high level to turn on a transistor MRES and reset the gate of the amplification means MSF. The signal φTX2 is kept at high level, and the capacitance CFD1 is added to the capacitance CFD2. In this state, signals φSEL and φTN1 are set at high level to turn on a selection switch MSEL and change-over switch MTN1. A noise signal N1 is read out from the amplification means MSF and accumulated in a capacitance CTN1 (first noise read-out).

The signal φTX2 is at low level, and the capacitance CFD2 is added to the gate of the amplification means MSF (the capacitance CFD1 is not added). In this state, the signals φSEL and φTN2 are set at high level to turn on the selection switch MSEL and change-over switch MTN2. A noise signal N2 is read out from the amplification means MSF and accumulated in the capacitance CTN2 (second noise read-out). With this operation, noise signals can be read out and accumulated while adding different capacitances to the gate of the amplification means after reset.

After that, the signals φTX2 and φTX1 are set at high level to transfer signal charges from a photodiode PD to the capacitances CFD1 and CFD2. The signal φTX1 is set at low level, and the signal φTX2 is kept at high level. While keeping the capacitance CFD1 added to the capacitance CFD2, the signals φSEL and φTS1 are set at high level to turn on the selection switch MSEL and change-over switch MTS1. A sensor signal S1 containing the noise signal N1 is read out from the amplification means MSF and accumulated in a capacitance CTS1 (first signal read-out).

Next, the signal φTX2 is set at low level to disconnect the capacitance CFD1 (signal charges accumulated in the capacitance CFD1 are transferred to the capacitance CFD2 side). While keeping the capacitance CFD2 added to the gate of the amplification means MSF, the signals φSEL and φTS2 are set at high level to turn on the selection switch MSEL and change-over switch MTS2. A sensor signal S2 containing the noise signal N2 is read out from the amplification means MSF and accumulated in the capacitance CTS2 (second signal read-out).

A signal φTH is set at high level to read out the sum of the noise signals N1 and N2 from the capacitances CTN1 and CTN2 through the common line and the sum of the sensor signals S1 and S2 containing the noise signals N1 and N2, respectively, from the capacitances CTS1 and CTS2 through the common line. A differential amplifier A calculates (S1+S2)−(N1+N2).

Figure 14:
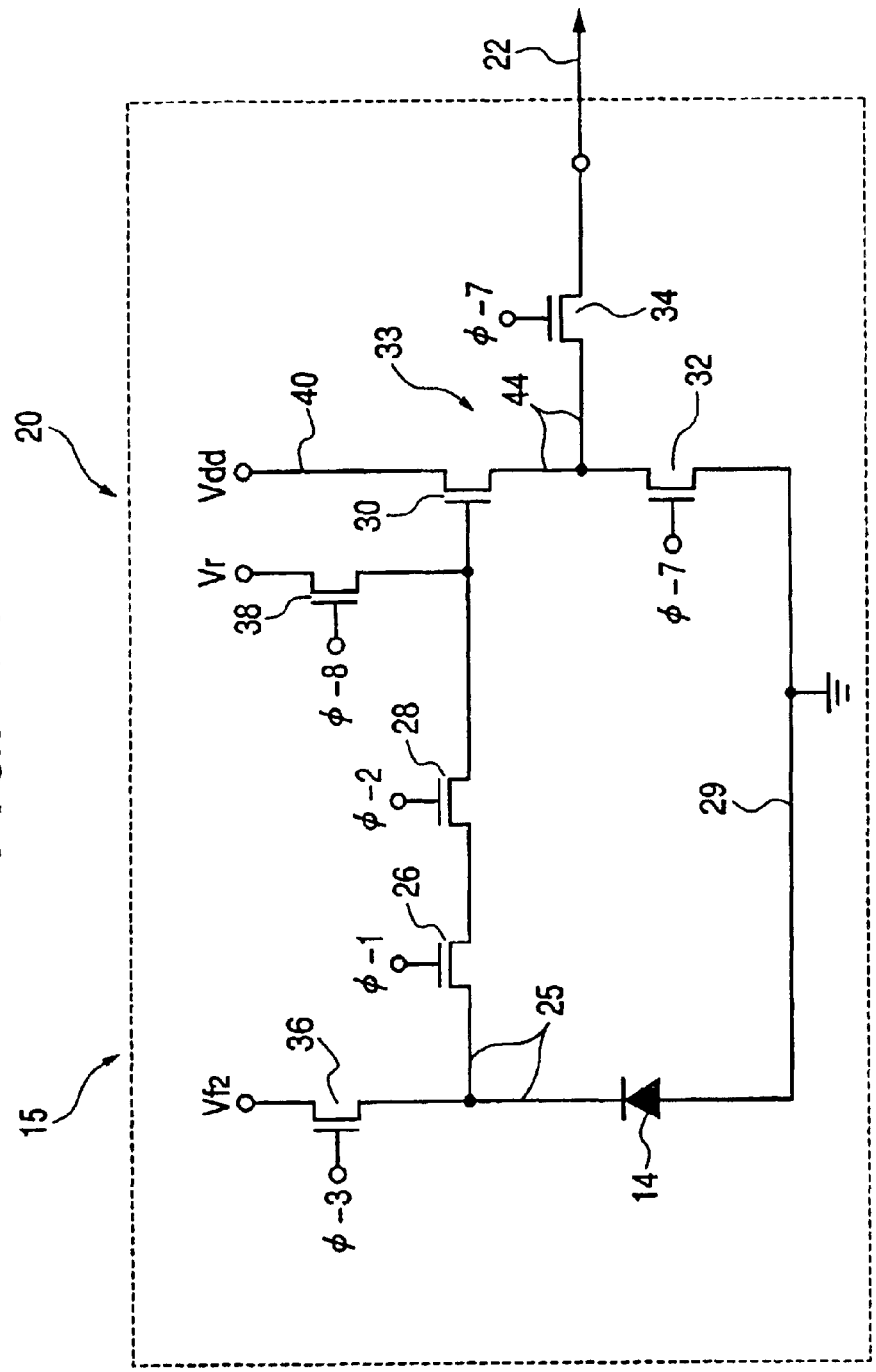
FIG. 14 is an explanatory view showing the structure of a pixel of a solid-state image pickup element.
Figure 15:
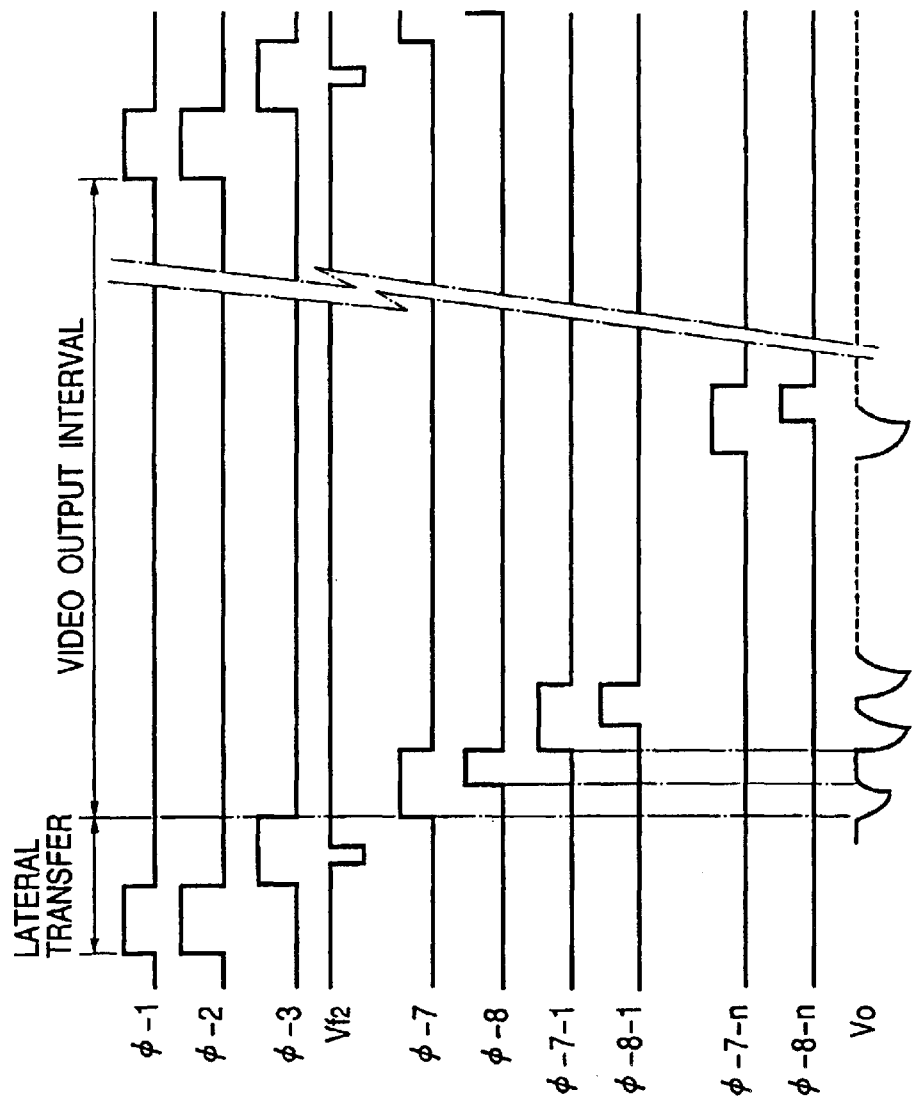
FIG. 15 is a timing chart showing the operation of the solid-state image pickup element shown in FIG. 14.

A solid-state image pickup apparatus having two transfer switches is disclosed in Japanese Patent Publication No. 7-105915. FIG. 14 is an explanatory view showing the structure of a pixel of a solid-state image pickup element shown in FIG. 3 of Japanese Patent Publication No. 7-105915. FIG. 15 is a timing chart shown as FIG. 4 of this prior art.

As shown in FIG. 14, the solid-state image pickup apparatus disclosed in Japanese Patent Publication No. 7-105915 also has transistors 26 and 28 for transferring signal charges from a photodiode 14 to the gate of a transistor 30.

In the solid-state image pickup apparatus disclosed in Japanese Patent Publication No. 7-105915, however, signals φ-1 and φ-2 are simultaneously set at high level to simultaneously turn on the transistors 26 and 28 to transfer signal charges, as shown in the timing chart of FIG. 15. This is different from the fourth embodiment shown in FIG. 13 in which the signals φTX1 and φTX2 are appropriately switched to turn on the transistors MTX1 and MTX2, change the capacitance to be added to the amplification means MSF, and output signals with different dynamic ranges.

In the first to fourth embodiments, one pixel cell has been described. In the fifth embodiment to be described below, the present invention is applied to an area sensor. Although an area sensor using the pixel cell shown in FIG. 1 will be described below, the pixels of the second to fourth embodiments can also be used. The pixel structure and the circuit arrangement of the read system are the same as in FIG. 1, and a detailed description thereof will be omitted.

Figure 16:
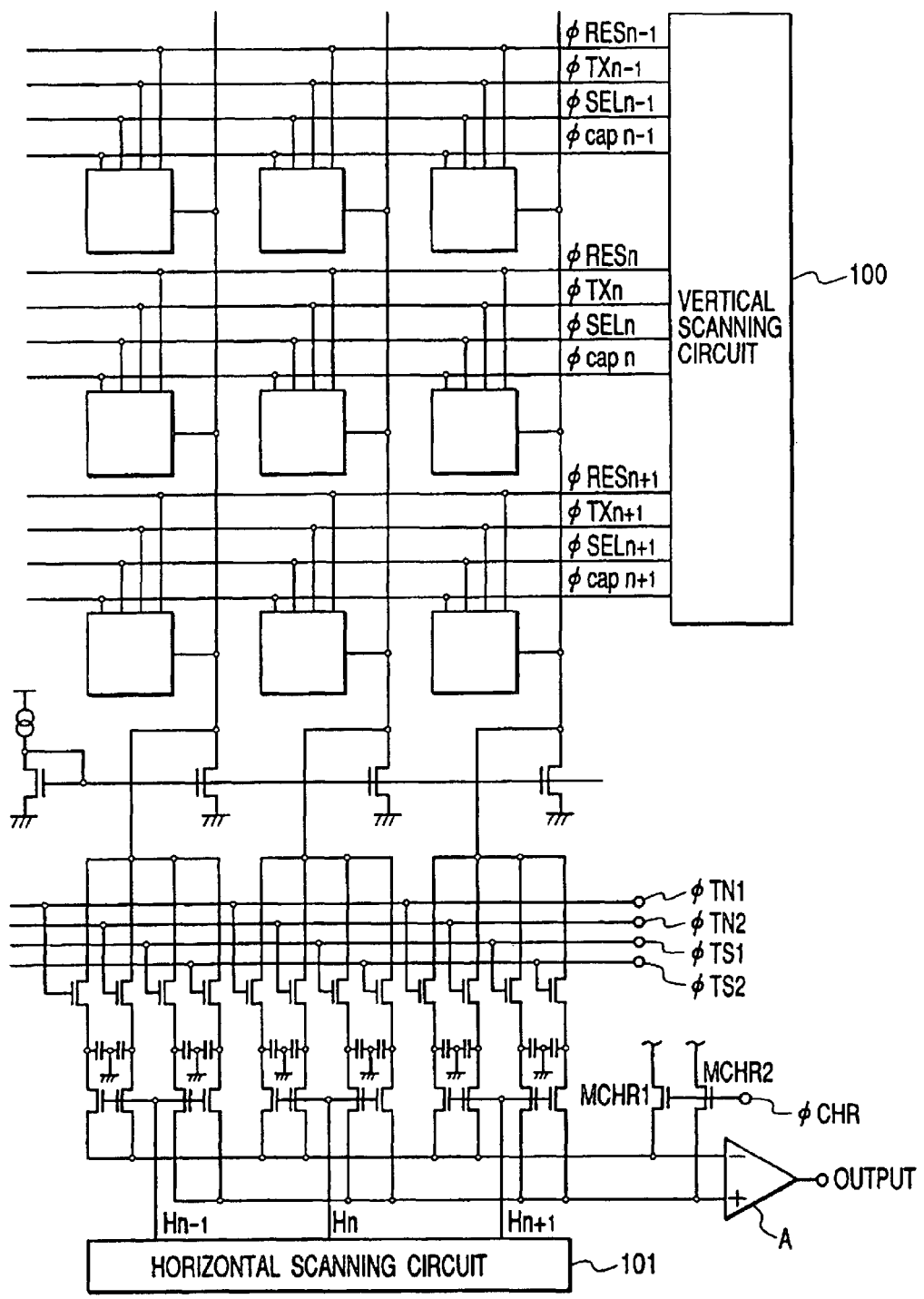
FIG. 16 is a schematic view showing the structure of an area sensor.

FIG. 16 is a schematic view showing the structure of an area sensor. As shown in FIG. 16, rows of pixel cells arrayed in a matrix are scanned by a vertical scanning circuit 100. Signals φRES, φTX, φSEL, and φcap are sent in units of rows. Noise and sensor signals are output to the vertical output lines and accumulated in corresponding capacitances in units of rows. The first and second noise signals and first and second sensor signals accumulated in the capacitances are scanned by a horizontal scanning circuit 101 in units of columns. The sum of the noise signals (N1+N2) and the sum of the sensor signals (S1+S2) are sequentially sent to the inverting input terminal (−) and noninverting input terminal (+) of a differential amplifier A in units of columns through the horizontal output lines. The differential amplifier A executes subtraction to obtain the signal (S1+S2)−(N1+N2) for each pixel. MOS transistors MCHR1 and MCHR2 for resetting the horizontal output lines to predetermined potentials are controlled by a signal φCHR.

Figure 17:
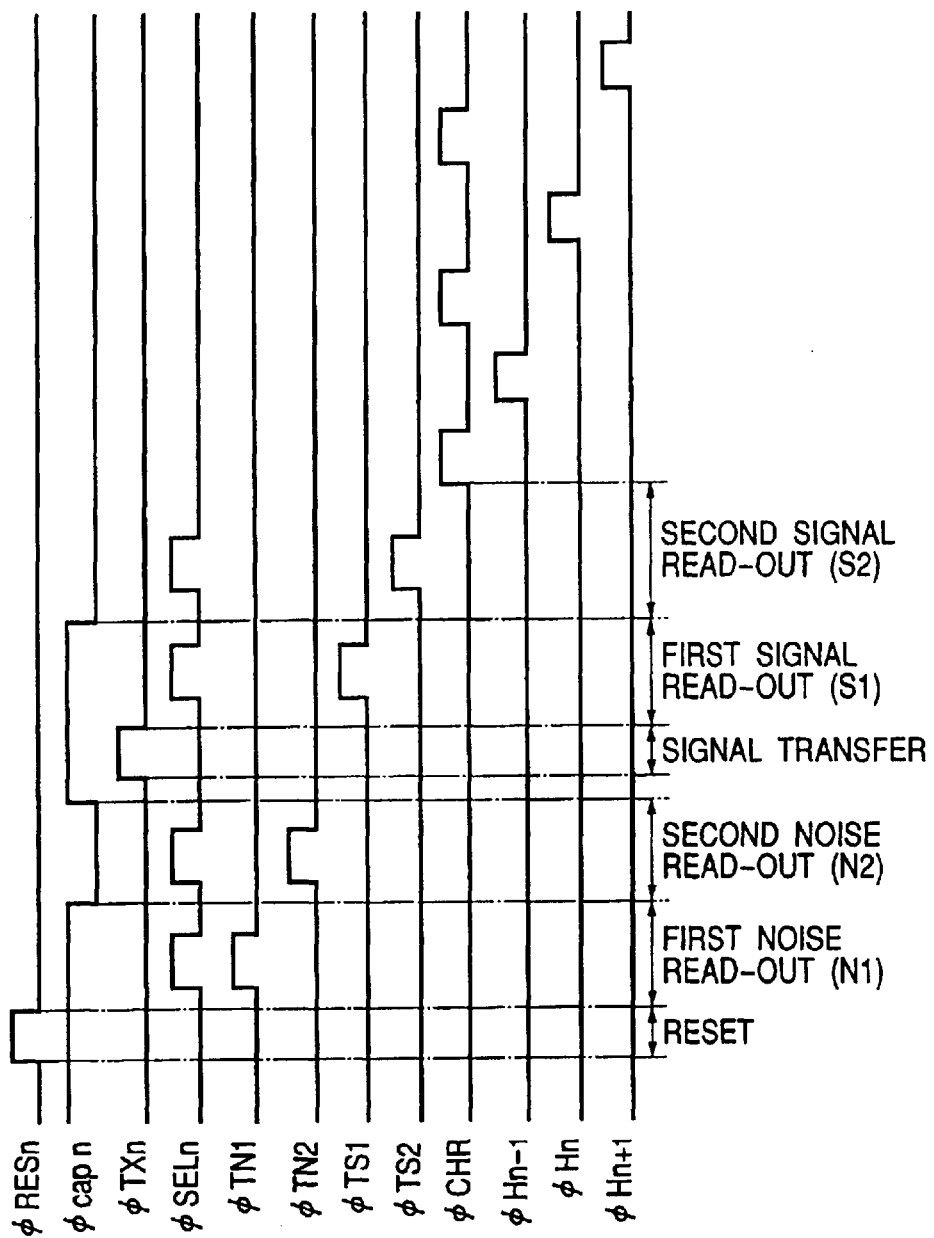
FIG. 17 is a timing chart of the area sensor.

FIG. 17 is a timing chart of the area sensor. This operation is the same as in FIG. 5, and a detailed description thereof will be omitted.

In the first embodiment, after the noise signals and sensor signals are added, respectively, the sum of noise signals is subtracted from the sum of sensor signals to output a signal. In the sixth embodiment, only subtraction for removing noise is performed without any addition, and a sensor signal (from which noise is removed) having a different dynamic range is selected in accordance with an output selection signal from the system side.

Figure 18:
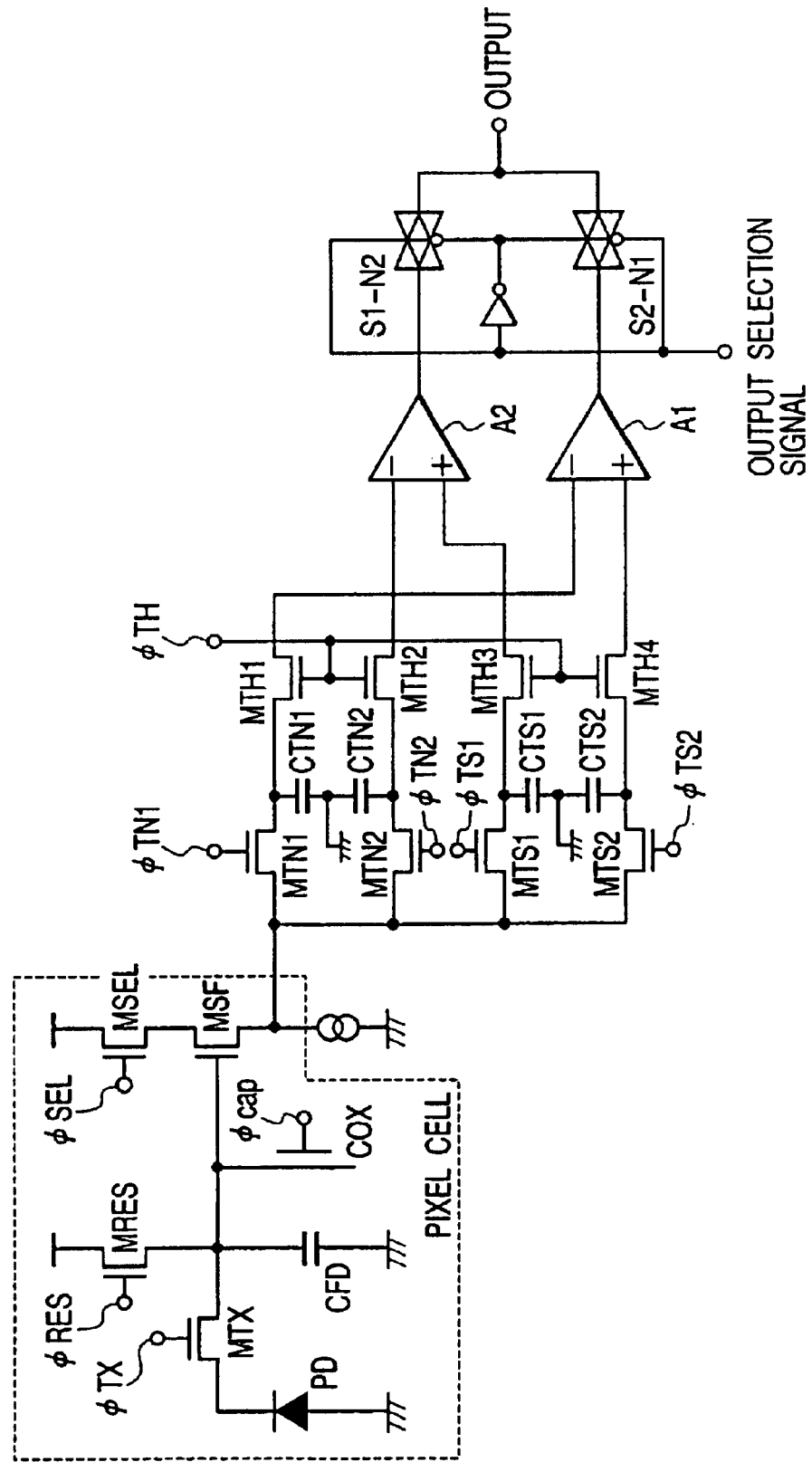
FIG. 18 is a schematic view showing still another solid-state image pickup apparatus.

FIG. 18 is a schematic view showing a solid-state image pickup apparatus according to the sixth embodiment of the present invention. The solid-state image pickup apparatus shown in FIG. 18 is different from that shown in FIG. 1 in the following point. In this embodiment, a noise signal N1 read out from a capacitance CTN1 and a sensor signal S2 read out from a capacitance CTS2 and containing the noise signal N1 are input to a differential amplifier A1, and S2−N1 is calculated to output a signal. On the other hand, a noise signal N2 read out from a capacitance CTN2 and a sensor signal S1 read out from a capacitance CTS1 and containing the noise signal N2 are input to a differential amplifier A2, and S1−N2 is calculated to output a signal. A selection means comprising two analog switches and an inverter is switched on the basis of an output selection signal to selectively output one of the signal (S2−N1) and the signal (S1−N2).

Figure 19:
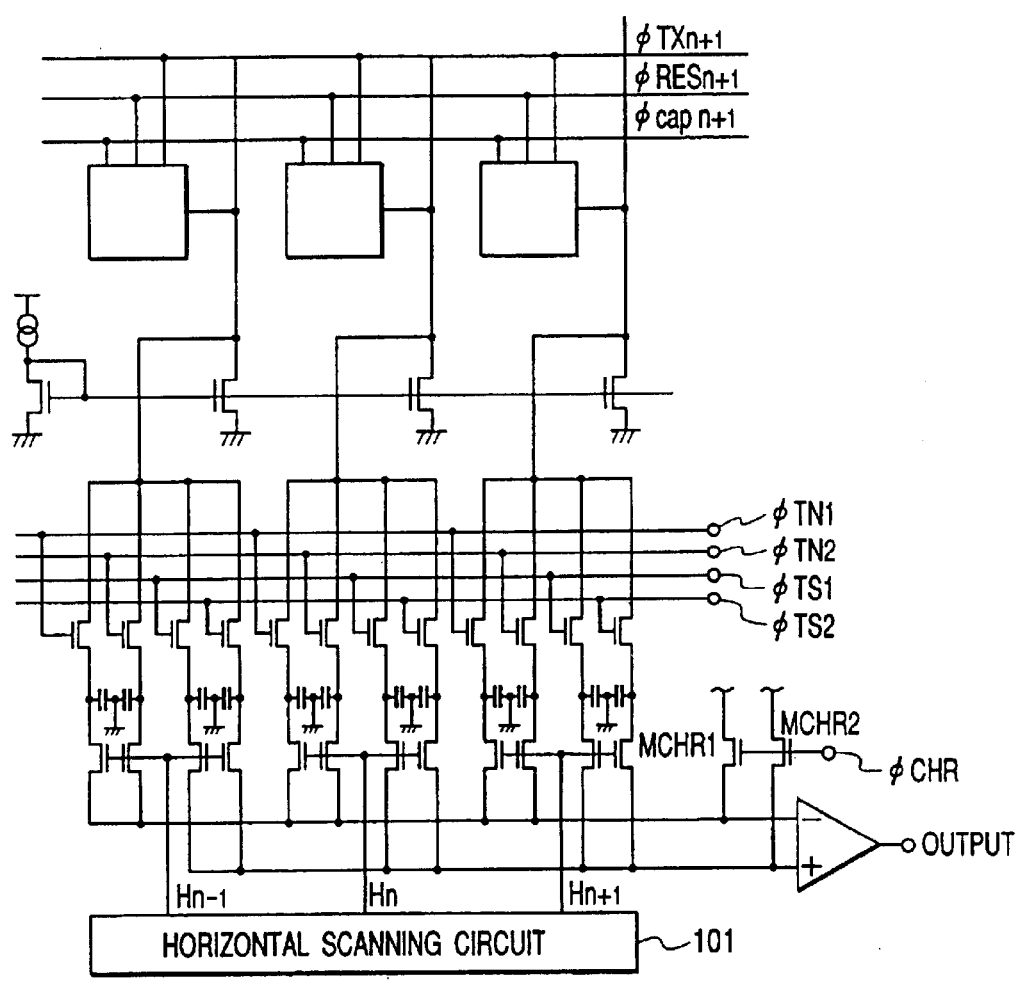
FIG. 19 is a schematic view showing still another solid-state image pickup apparatus.

The present invention can be used not only to an area sensor but also to a line sensor. This will be described as the seventh embodiment. A line sensor has the same pixel structure as described above except that each pixel has no selection switch. FIG. 19 is a schematic view of a line sensor. The basic structure of the line sensor is the same as that of the area sensor shown in FIG. 16.

As described above, according to the first to seventh embodiments, image signals having different dynamic ranges can be obtained using signal charges accumulated in the same accumulation period.

More specifically, a signal having high sensitivity but narrow dynamic range and a signal having low sensitivity but wide dynamic range can be obtained. In this case, the signal having high sensitivity but narrow dynamic range and the signal having low sensitivity but wide dynamic range can be selectively output as needed. For example, the signal can be selected on the basis of the luminance signal level.

The solid-state image pickup apparatuses of the first to seventh embodiments can be used for, e.g., back light correction.

Figure 21:
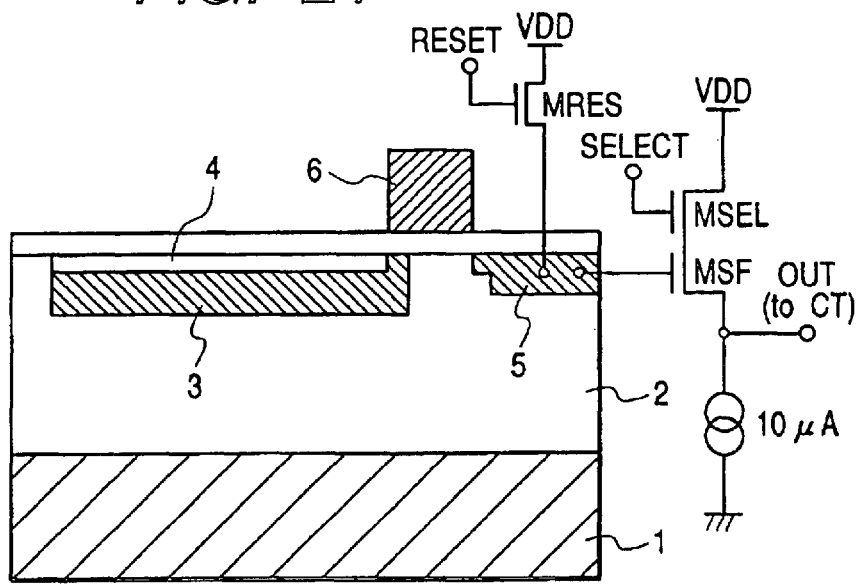
FIG. 21 is a schematic explanatory view showing the arrangement of still another solid-state image pickup apparatus.

FIG. 21 is a schematic explanatory view showing the arrangement of a solid-state image pickup apparatus according to the eighth embodiment. Referring to FIG. 21, the solid-state image pickup apparatus has an n-type semiconductor substrate 1, p-type well region 2 formed in the n-type semiconductor substrate 1, n-type diffusion region 3, and p-type region 4 formed on the surface of the n-type diffusion region 3. The p-type well region 2, n-type diffusion region 3, and p-type region 4 form a photodiode. Signal charges accumulated in the photodiode are transferred to a charge/voltage conversion unit 5. This charge/voltage conversion unit is formed from an impurity diffusion region. Voltage conversion is achieved by all capacitances connected to this node. This region is generally called a floating diffusion (FD) region, including all capacitance components.

A transfer gate electrode 6 transfers signal charges from the photodiode to the FD region 5. The n-type diffusion region 3 and FD region 5 serve as the source and drain regions of a transfer MOS transistor (MTX), respectively. The FD region 5 is electrically connected to the gate of an output MOS transistor MSF and the drain of a reset MOS transistor MRES. The drain of the MOS transistor MSF is connected to the source of a MOS transistor MSEL serving as a selection switch, and the source of the MOS transistor MSF is connected to a constant current source, thereby forming a source follower circuit. When the signal charges transferred to the FD region 5 are applied to the gate of the MOS transistor MSF as a voltage signal, a signal is output from the source follower circuit. When the reset MOS transistor MRES is turned on, the FD region 5 is set at the reset potential.

Figure 22:
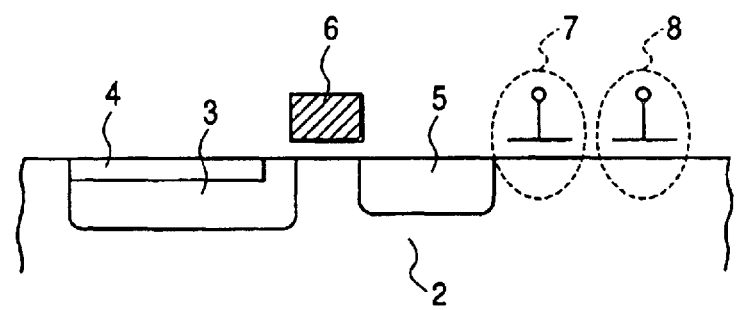
FIG. 22 is a schematic explanatory view showing the arrangement of still another solid-state image pickup apparatus.

The FD region 5 has a capacitance formed by the junction capacitance or line capacitance with respect to the p-type well region 2. As shown in FIG. 22, MOS structure units 7 and 8 are series-connected to the FD region 5, so the MOS capacitances are connected to the capacitance of the FD region 5. In this case, the MOS capacitances are series-connected. However, the MOS capacitances may be connected in parallel.

The FD region 5 and MOS structure units 7 and 8 construct a charge/voltage conversion unit. The capacitances of the MOS structure units 7 and 8 can be set to have a dependence on voltage, which is different from that of the FD region, by adjusting the well density, gate oxide layer thickness, or a fixed voltage to be applied to the gate electrode. Although the capacitance formed by the junction capacitance or line capacitance between the FD region 5 and p-type well region 2 actually has a dependence on voltage, the capacitance change is small within the use range.

Figure 23A:
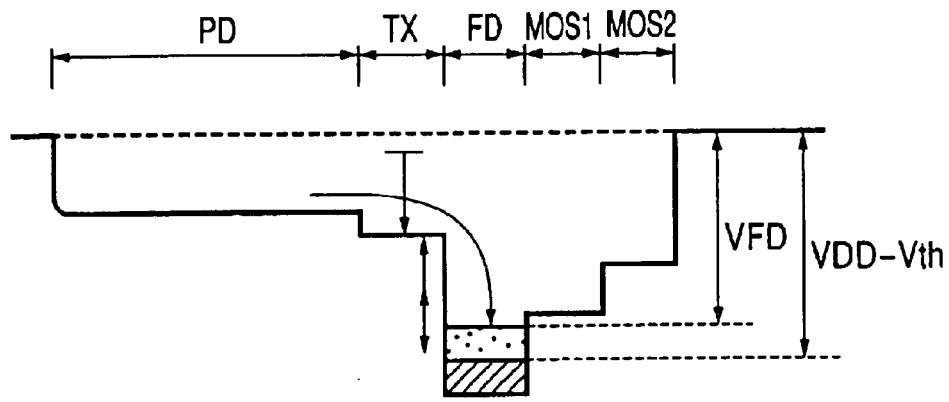
FIGS. 23A, 23B and 23C are explanatory views of FD and MOS structure units having a staircase potential structure.
Figure 23B:
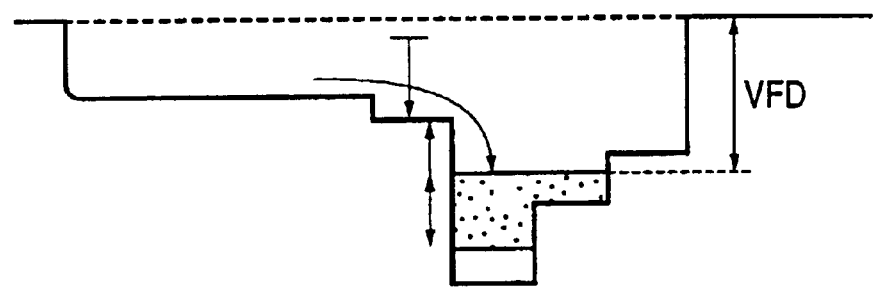
Figure 23C:
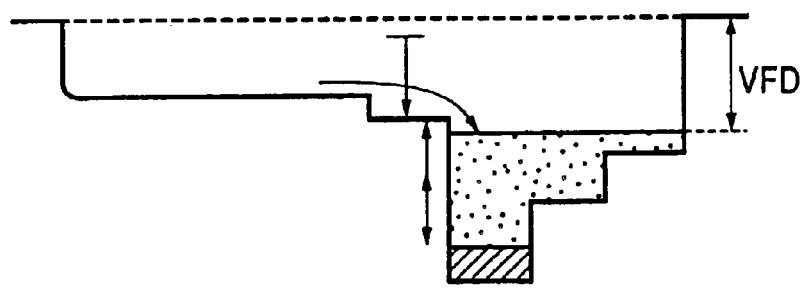
Figure 24A:
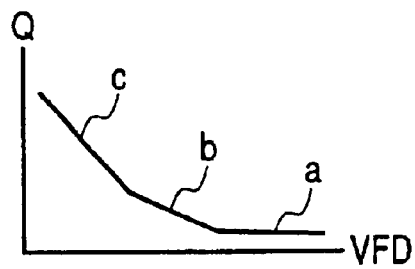
FIGS. 24A, 24B and 24C are graphs showing the VFD vs. Q characteristics, VFD vs. Cap characteristics, and light amount vs. output characteristics, respectively.
Figure 24B:
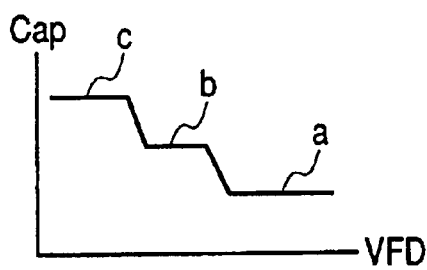
Figure 24C:
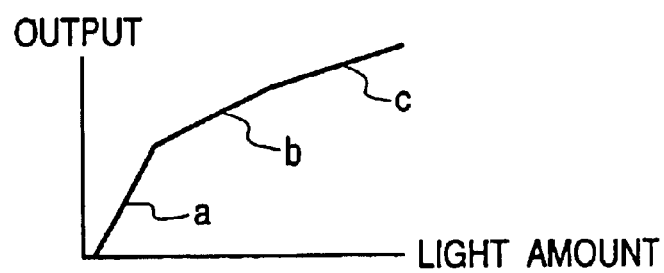

FIGS. 23A to 23C are explanatory views of the FD region and MOS structure units which have a staircase potential structure. FIG. 24A is a graph showing the VFD (floating diffusion voltage) vs. Q (signal charge amount) characteristics. FIG. 24B is a graph showing the VFD vs. Cap (capacitance) characteristics. FIG. 24C is a graph showing the light amount vs. output characteristics (sensitivity characteristics). Symbols a, b, and c in FIGS. 24A to 24C denote the characteristics corresponding to the operative states shown in FIGS. 23A to 23C, respectively. This potential structure can be obtained by connecting the MOS capacitances in series or parallel.

Referring to FIGS. 23A to 23C, this structure has a photodiode unit PD, transfer MOS transistor unit TX, floating diffusion unit FD, first MOS structure unit MOS1, and second MOS structure unit MOS2. Referring to FIGS. 23A to 23C, the transfer MOS transistor is ON, and the energy level is lower than the level of the photodiode PD, so all charges accumulated in the photodiode PD can be transferred to the FD region. The potential of the FD region is reset to VDD-Vth (Vth is the amount of voltage drop between the source and drain by the transfer MOS transistor) by the reset MOS transistor MRES (not shown).

When the staircase potential structure (FD and MOS structure units) is formed, and the amount of signal charges accumulated in the photodiode unit (PD) is small (light amount is small), as shown in FIG. 23A, the signal charges are transferred to the deep portion of the potential well. At this time, a floating diffusion voltage VFD is high, an accumulated signal charge amount Q is small (FIG. 24A), a capacitance Cap is small (FIG. 24B), the change rate of the output with respect to the light amount is high, and the sensitivity is high (FIG. 24C).

As shown in FIGS. 23B and 23C, as the amount of signal charges accumulated in the photodiode unit (PD) increases, the signal charges are also transferred to shallow portions of the staircase potential structure of the MOS structure units (MOS1, MOS2) stepwise. The floating diffusion voltage VFD becomes low, the accumulated signal charge amount Q increases (FIG. 24A), the capacitance Cap increases stepwise (FIG. 24B), the change rate of the output with respect to the light amount becomes low, and the sensitivity becomes low (FIG. 24C). In this way, the sensitivity can be changed in correspondence with the transferred signal charge amount.

Figure 25A:
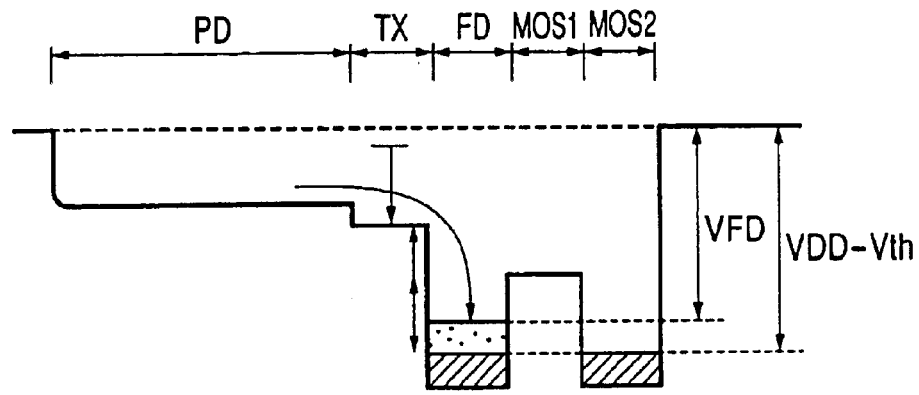
FIGS. 25A, 25B and 25C are explanatory views of FD and MOS structure units having an inverted "U"-shaped potential structure.
Figure 25B:
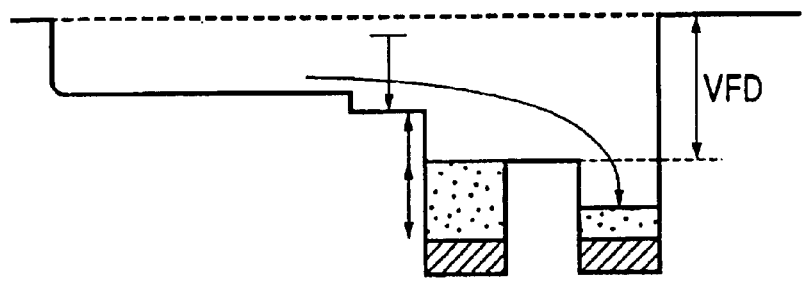
Figure 25C:
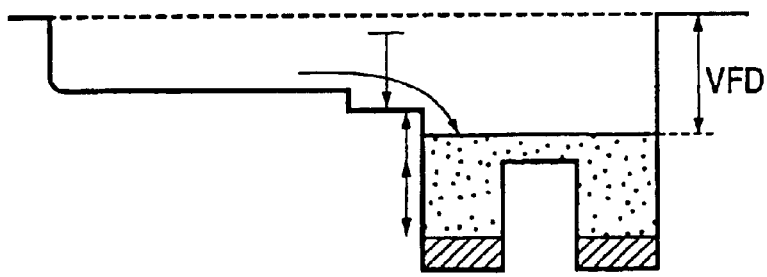

As shown in FIGS. 25A to 25C, an inverted "U"-shaped potential structure may be formed. This potential structure can be obtained by series-connecting the MOS capacitances.

In this case, when the amount of signal charges accumulated on the photodiode unit (PD) is small, the signal charges are transferred to the potential well of the FD region, as shown in FIG. 25A. As the amount of signal charges accumulated in the photodiode unit increases, the signal charges are transferred to the potential well formed by the MOS capacitance of the MOS structure unit MOS2, as shown in FIG. 25B. As the amount of signal charges further increases, the signal charges are transferred to the MOS capacitance of the MOS structure unit MOS1, as shown in FIG. 25C.

Figure 26A:
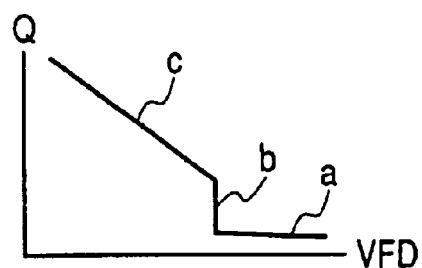
FIGS. 26A, 26B and 26C are graphs showing the VFD vs. Q characteristics, VFD vs. Cap characteristics, and light amount vs. output characteristics, respectively.
Figure 26B:
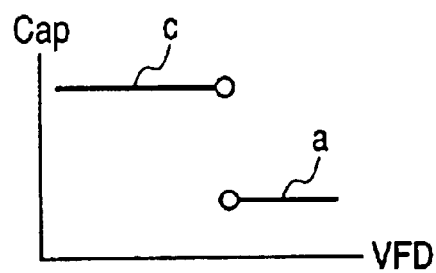
Figure 26C:
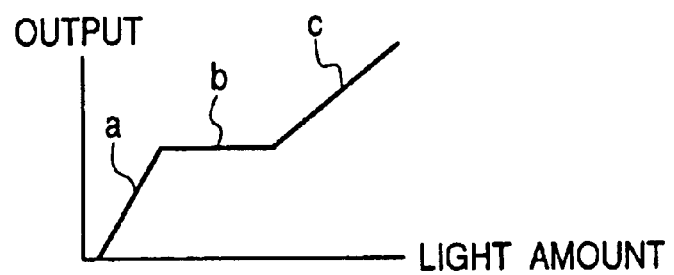

FIG. 26A shows the VFD (floating diffusion voltage) vs. signal charge amount characteristics at this time. FIG. 26B shows the VFD vs. Cap characteristics. FIG. 26C shows the light amount vs. output characteristics (sensitivity characteristics). Symbols a, b, and c in FIGS. 26A to 26C denote the characteristics corresponding to the operative states shown in FIGS. 25A to 25C, respectively.

In this embodiment, the staircase potential structure and inverted "U"-shaped potential structure have been described. However, the present invention is not limited to these potential structures.

Figure 27:
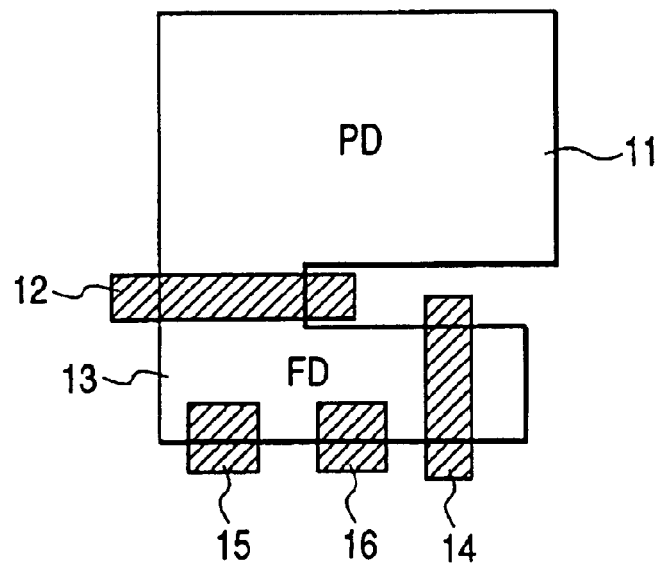
FIG. 27 is a schematic plan view of a solid-state image pickup apparatus having a MOS capacitance.
Figure 28:
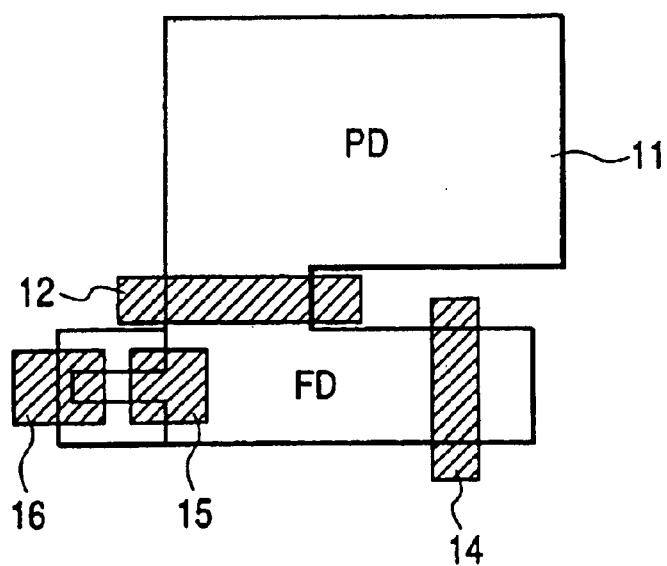
FIG. 28 is a schematic plan view of another solid-state image pickup apparatus having a MOS capacitance.

FIGS. 27 and 28 are schematic plan views of solid-state image pickup apparatuses having the above MOS capacitance.

Referring to FIGS. 27 and 28, each solid-state image pickup apparatus has a photodiode (PD) 11, gate 12 of a transfer MOS transistor, floating diffusion region (FD) 13, gate 14 of a reset MOS transistor, and gate electrodes 15 and 16 for forming a MOS capacitance.

The ninth embodiment will be described below in which the staircase potential structure in FIGS. 23A to 23C or inverted "U"-shaped potential structure in FIGS. 25A to 25C is formed using not the MOS capacitance but buried p-n junction.

Figure 29:
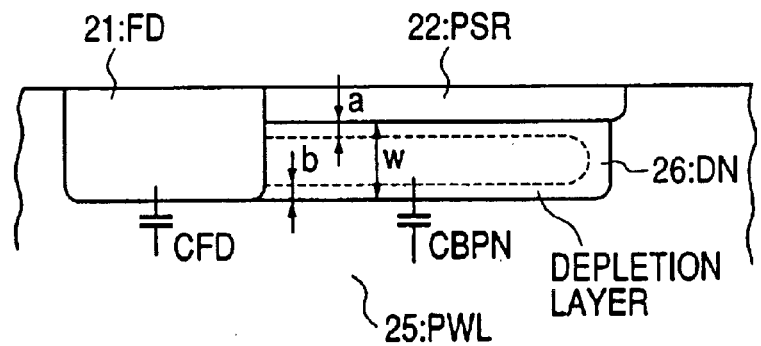
FIG. 29 is a schematic sectional view showing an FD region and buried p-n junction.
Figure 30:
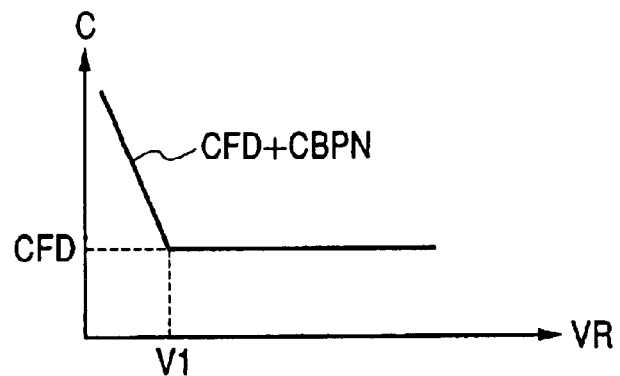
FIG. 30 is a graph showing the relationship between a reverse bias voltage and capacitance.

FIG. 29 is a schematic sectional view showing an FD region and buried p-n junction. The structure shown in FIG. 29 has an FD region 21, heavily doped p-type surface region (PSR) 22, n-type diffusion region (DN) 26 that forms p-n junction with the PSR 22, and p-type well region (PWL) 25 that forms p-n junction with the n-type diffusion region 26 (DN). When a reverse bias voltage is applied to the p-n junction portion, a depletion layer extends. As shown in FIG. 29, there are a depletion layer extending from the p-n junction portion between the PSR 22 and n-type diffusion region DN 26 (depletion layer width a) and a depletion layer extending from the p-n junction portion between the n-type diffusion region DN 26 and PWL 25 (depletion layer width b). As the two depletion layers extend, all charges in the depletion layers are removed. For this reason, the charges are not accumulated, and the capacitance becomes small. When the reverse bias voltage becomes high to bring the depletion layers into contact with each other (w=a+b; w is the depth of the n-type diffusion region DN 26), and the capacitance of this portion almost disappears. Hence, as shown in FIG. 30, when a floating diffusion voltage VFD is high, and a reverse bias voltage VR is high, the capacitance is formed almost only by a capacitance CFD of the FD region. However, when the floating diffusion voltage VFD becomes low, and the reverse bias voltage VR becomes lower than a threshold voltage V1, the depletion layer width (a+b) becomes smaller than the depth w. A capacitance CBPN of the buried p-n junction portion is added to the capacitance CFD. The threshold voltage V1 can be arbitrarily changed by changing the impurity concentration or depth w of the n-type diffusion region. When another n-type diffusion region is formed by changing the impurity concentration or width w of the n-type diffusion region, the staircase potential structure shown in FIGS. 23A to 23C or inverted "U"-shaped potential structure shown in FIGS. 25A to 25C can be formed.

Figure 31:
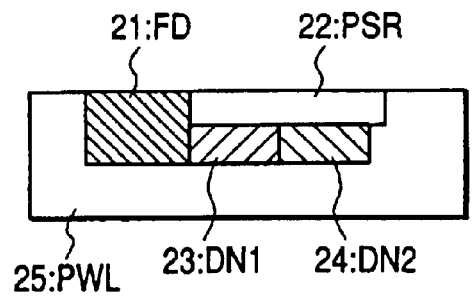
FIG. 31 is a schematic sectional view showing an FD region and buried p-n junction.

FIG. 31 is a schematic sectional view showing an FD region and buried p-n junction when a staircase potential structure or inverted "U"-shaped potential structure is to be formed. The structure shown in FIG. 31 has an FD region 21, heavily doped p-type surface region (PSR) 22, n-type diffusion regions (DN1, DN2) 23 and 24 that form a p-n junction with the PSR 22, and p-type well region (PWL) 25. The n-type diffusion regions 23 and 24 are set at different impurity densities. The impurity densities are appropriately set to form the staircase potential structure or inverted "U"-shaped potential structure. To form the staircase potential structure, the n-type diffusion regions can be connected in series or parallel. To form the inverted "U"-shaped potential structure, the n-type diffusion regions are connected in series. Instead of or in addition to changing the impurity concentration, the depth w of the n-type diffusion region may be changed.

Figure 32:
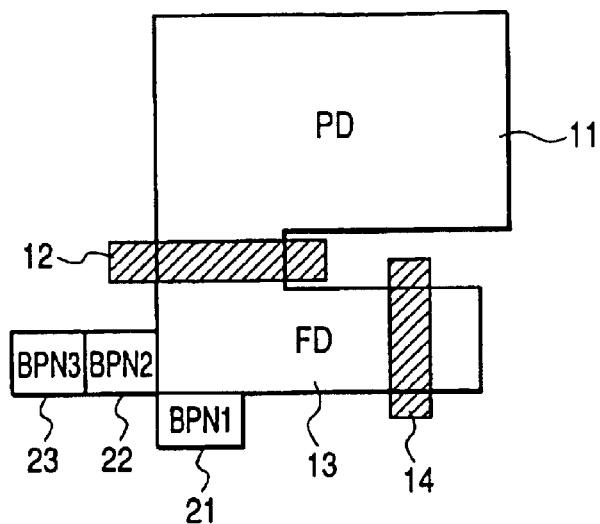
FIG. 32 is a schematic plan view of a solid-state image pickup apparatus having a buried p-n junction.

FIG. 32 is a schematic plan view of a solid-state image pickup apparatus having the above buried p-n junction. The same reference numerals as in FIG. 27 denote the same members in FIG. 32. The structure shown in FIG. 32 has p-n junction portions 21 to 23.

The threshold voltage V1 can be arbitrarily changed by changing not only the impurity concentration or depth w of the n-type diffusion region but also the planar shape (e.g., width) of the n-type diffusion region.

The DN region 26 in FIG. 29 has the p-type region only in the vertical direction at the portion close to the FD region 21. A portion close to the distal end comes into contact with the p-type region even at the side surface of the DN region 26 and therefore is readily depleted. That is, the n-type diffusion region is readily depleted at a portion near the side surface. For this reason, when the width of the n-type diffusion region is small, the threshold voltage V1 becomes low due to the influence of the p-n junction portion at the side surface.

Figure 33:
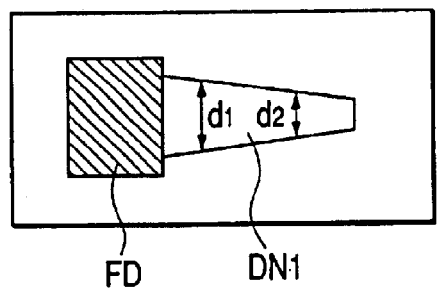
FIG. 33 is a plan view showing the planar shape of an n-type diffusion region when a staircase potential structure is formed.
Figure 34:
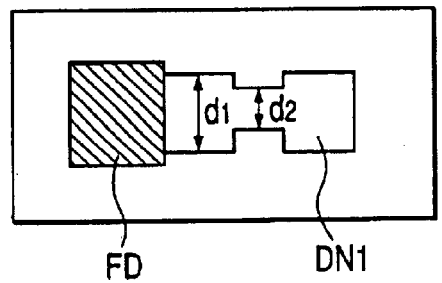
FIG. 34 is a plan view showing the planar shape of an n-type diffusion region when an inverted "U"-shaped potential structure is formed.
Figure 47:
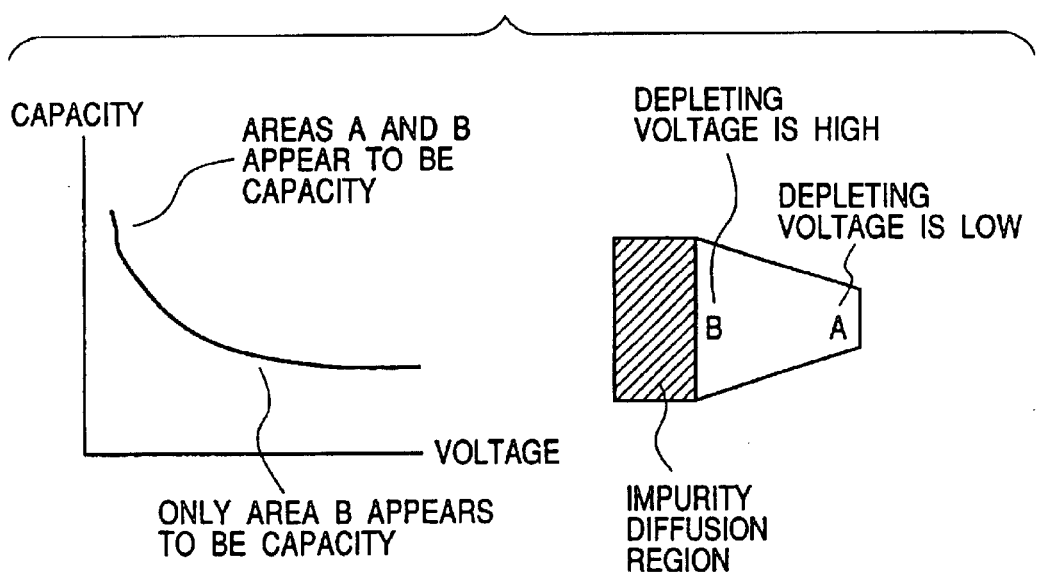
FIG. 47 is a graph showing the VFD vs. Cap characteristics.

FIG. 34 shows the planar shape of the n-type diffusion region when an inverted "U"-shaped potential structure shown in FIGS. 25A to 25C is formed. FIG. 33 shows the planar shape of the n-type diffusion region when the voltage vs. capacitance characteristics shown in FIG. 47 are obtained. In an n-type diffusion region DN1 shown in FIG. 33, a width d2 of a region close to the distal end portion is smaller than a width d1 of a region close to the FD region 5. The region close to the distal end portion is readily depleted (the depletion voltage is lower). In the n-type diffusion region DN1 shown in FIG. 34, the width d2 of the narrow portion is smaller than the width d1 of the region close to the FD region. The narrow region is readily depleted.

In the above-described eighth and ninth embodiments, signal charges are transferred by fixing the reset voltage at a predetermined potential (VDD). In the 10th embodiment, the sensitivity can be switched by appropriately changing the reset voltage.

Figure 35:
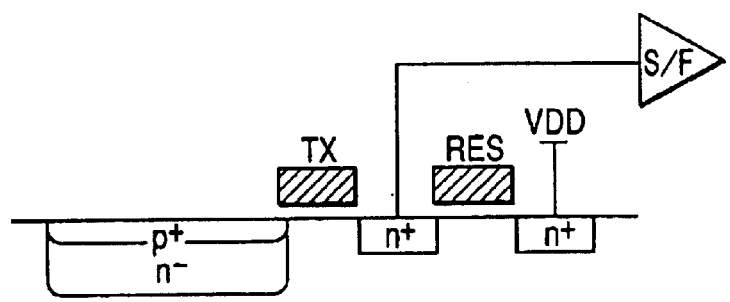
FIG. 35 is a schematic view of a solid-state image pickup apparatus including a reset MOS transistor.

The operation of a solid-state image pickup apparatus according to the present invention will be described first with reference to FIGS. 35 and 36A to 36D. FIG. 35 is a schematic view of a solid-state image pickup apparatus including a reset MOS transistor. FIGS. 36A to 36D are potential charts showing the light accumulation operation, reset operation, noise read-out operation, and signal transfer/ signal read-out operation, respectively.

Figure 36A:
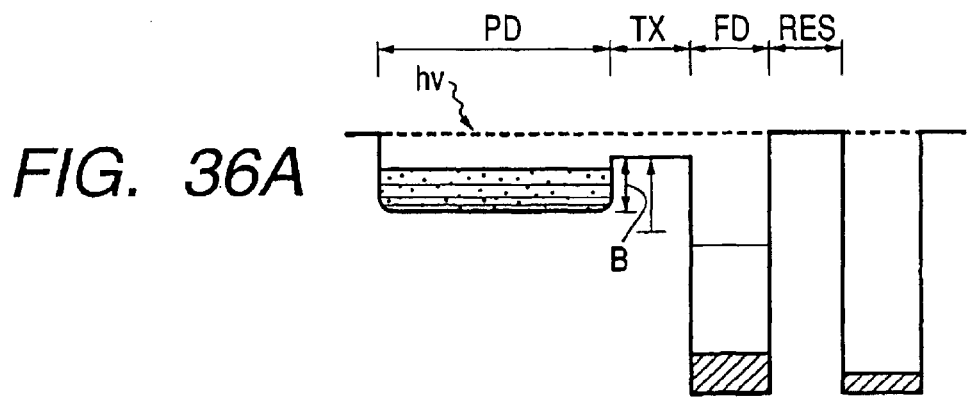
FIGS. 36A, 36B, 36C and 36D are potential charts showing the light accumulation operation, reset operation, noise read-out operation, and signal transfer/signal read-out operation, respectively.

As shown in FIG. 36A, in a state wherein a transfer transistor MTX and reset MOS transistor MRES are OFF, light is incident on a photodiode PD, and optical signal charges are accumulated.

Figure 36B:
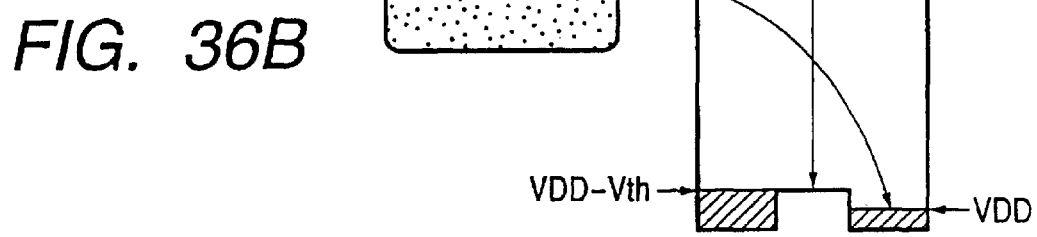

Next, as shown in FIG. 36B, the reset MOS transistor MRES is turned on to reset the FD region. The reset voltage is VDD. The FD region is set at a potential (VDD−Vth). Signal charges overflowed from the photodiode are drained through the reset MOS transistor MRES.

Figure 36C:
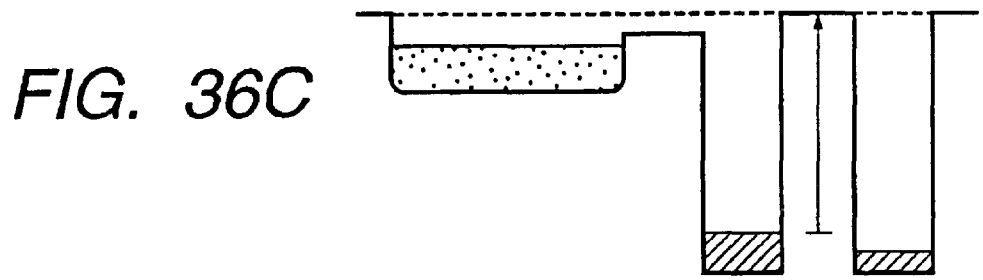

As shown in FIG. 36C, the reset MOS transistor MRES is turned off to read out a noise signal.

Figure 36D:
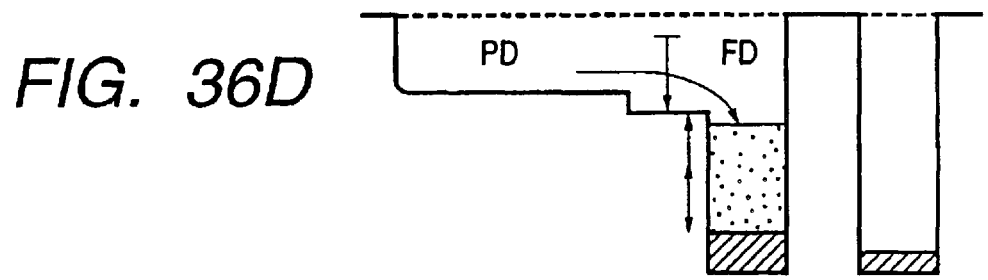

Next, as shown in FIG. 36D, the transfer transistor MTX is turned on to transfer the signal charges from the photodiode PD to the FD region. The signal charges are read out as a voltage signal. The previously readout noise signal is subtracted from the voltage signal to obtain a signal without any noise.

In this solid-state image pickup apparatus, the sensitivity can be changed by appropriately changing the reset potential. A case wherein the FD region and MOS structure units have a staircase potential structure will be described below.

Figure 37A:
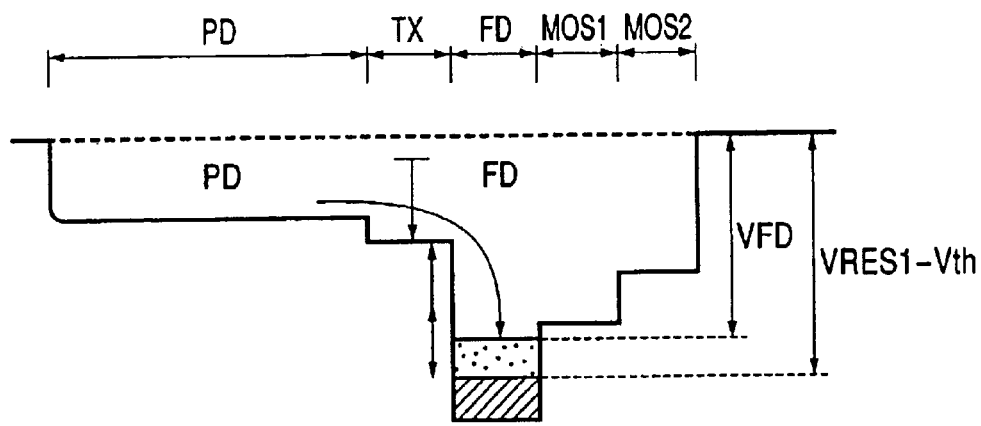
FIGS. 37A and 37B are potential charts showing an operation of changing the reset potential to change the sensitivity.
Figure 37B:
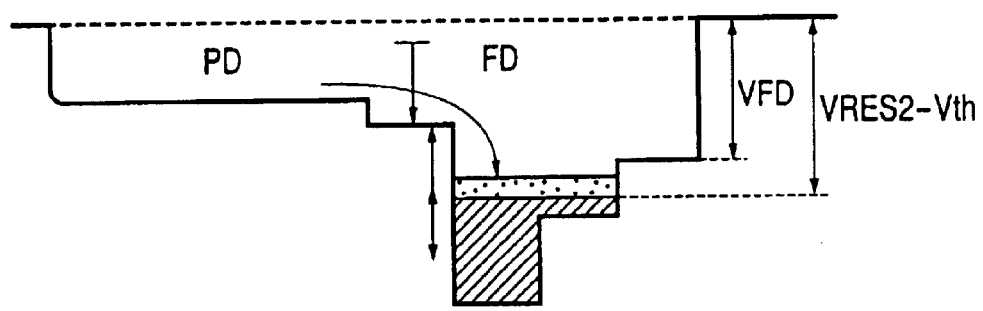
Figure 38:
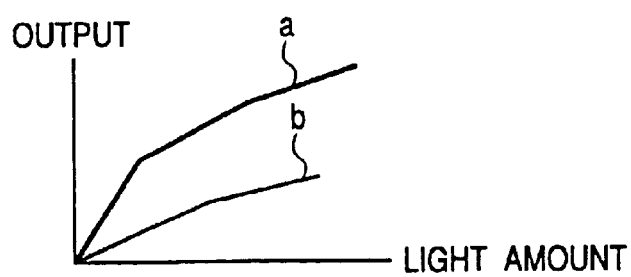
FIG. 38 is a graph showing the light amount vs. output characteristics (sensitivity characteristics)

For example, when the reset voltage is VRES1 (=VDD), signal charges are accumulated in the deep portion of the potential well of the FD region, as shown in FIG. 37A. On the other hand, when the reset voltage is VRES2 (<VRES1), signal charges are accumulated in a shallower portion of the potential well formed from the FD region and MOS structure unit MOS1, as shown in FIG. 37B. That is, when the reset voltage is made low, charges corresponding to the reset voltage are accumulated in the deep portion of the potential well of the FD region, so the signal charges are accumulated in a larger capacitance state. For this reason, when the reset voltage is controlled, the sensitivity can be switched. FIG. 38 is a graph showing the light amount vs. output characteristics (sensitivity characteristics). Referring to FIG. 38, a represents the characteristics when the reset voltage is VRES1, and b represents the characteristics when the reset voltage is VRES2.

A reset voltage application method for a case wherein pixels each constructed by the above solid-state image pickup apparatus are arrayed in a matrix will be described below. The members of the pixel to be described below are the same as in FIG. 1.

Figure 39:
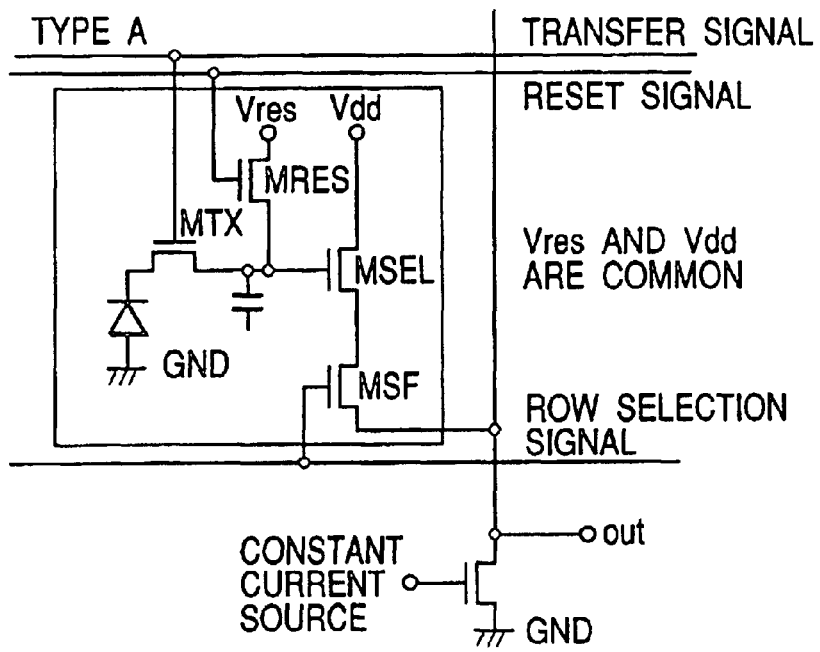
FIG. 39 is a view showing a pixel structure so as to explain the reset voltage application method.

To set the same sensitivity for all pixels, a predetermined reset voltage is applied to all pixels. In this case, as shown in FIG. 39, the sources of the transfer MOS transistors MRES of all pixels are connected to a voltage source for supplying the reset voltage VRES.

Figure 40:
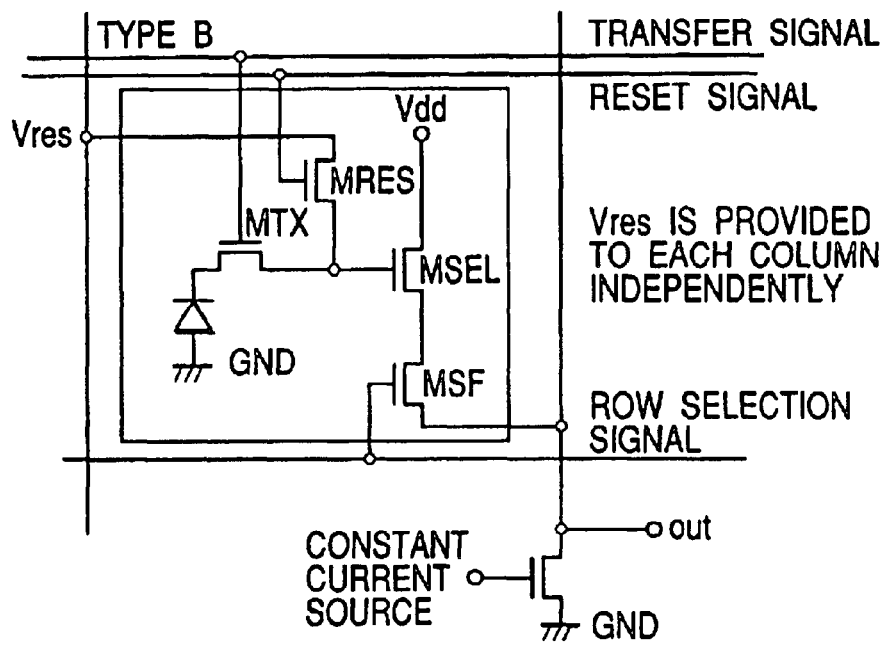
FIG. 40 is a view showing another pixel structure so as to explain the reset voltage application method.
Figure 41:
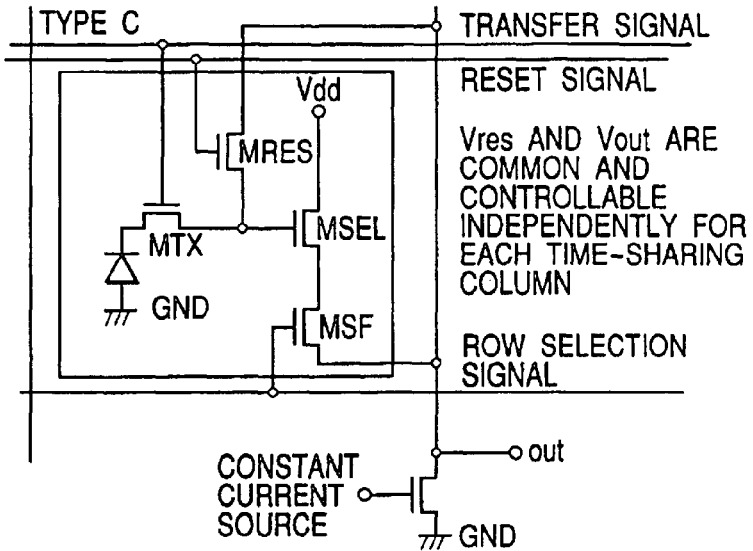
FIG. 41 is a view showing still another pixel structure so as to explain the reset voltage application method.

To arbitrarily set the sensitivity in units of pixels, an arbitrary reset voltage is set and applied in units of pixels. In this case, the reset voltage is applied in units of columns, and the pixels are scanned in units of rows. For the pixel shown in FIG. 40, a power supply line for reset voltage application is prepared for each column, the sources of the transfer MOS transistors MRES of one column are commonly connected, and the reset signal is applied to the gates of the transfer MOS transistors MRES of each row, thereby applying an arbitrary reset voltage in units of pixels. For the pixel shown in FIG. 41, the power supply line for reset voltage application is also used as an output signal line. The reset operation and signal read-out operation are performed at different timings. Hence, when the output signal line and the source of the transfer MOS transistor MRES are connected, and the reset signal is applied to the gates of the transfer MOS transistors MRES of each row, an arbitrary reset voltage can be applied in units of pixels.

In this embodiment, the sensitivity can be switched by changing the reset voltage. Hence, a solid-state image pickup apparatus which samples the light amount incident on a pixel in advance and sets the reset voltage in accordance with the sampling result can be constructed. In the pixel structure shown in FIG. 39, the reset voltage is changed for all pixels. In the pixel structures shown in FIGS. 40 and 41, the reset voltage can be changed for some pixels.

Figure 42:
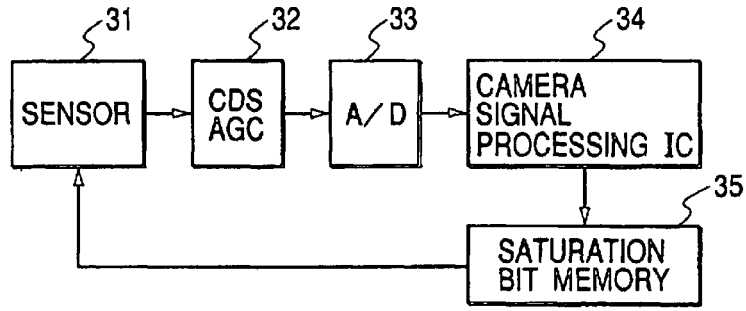
FIG. 42 is a block diagram of a camera apparatus using a solid-state image pickup apparatus which sets the reset voltage in accordance with a sampling result.

FIG. 42 is a block diagram of a camera apparatus using a solid-state image pickup apparatus which sets the reset voltage in accordance with a sampling result. Referring to FIG. 42, the apparatus has a solid-state image pickup element (sensor) 31 capable of arbitrarily setting the reset voltage, CDS (correlation double sampling circuit)/AGC (automatic gain controller) 32, A/D converter 33, camera signal processing IC 34 for processing a signal and outputting it as, e.g., an NTSC signal, and saturation bit memory 35.

In this camera apparatus, when an input has a predetermined value or more, the camera signal processing IC 34 determines that the signal is saturated. In accordance with the determination result, the saturation bit is stored in the saturation bit memory 35, and the saturation bit signal is input to the sensor 31. It is determined on the basis of this saturation bit signal whether the pixel is saturated. The reset voltage is controlled in accordance with the determination result (in this case, a signal one frame ahead is used as a sampling signal).

Figure 43:
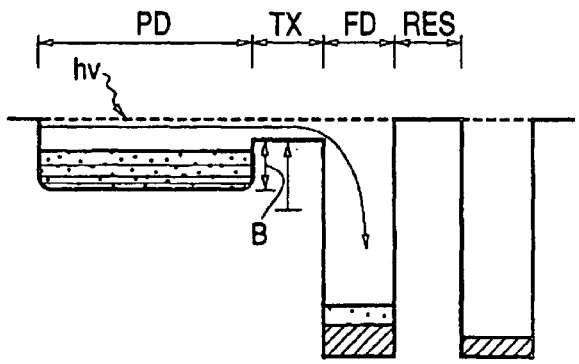
FIG. 43 is a potential chart for explaining a sampling signal detection operation.

As shown in FIG. 43, during the signal charge accumulation period, the reset MOS transistor MRES is turned off to accumulate a signal that has overflowed from the photodiode PD onto the FD region, i.e., an overflow drain (OFD) signal (or a smear signal).

Saturation is determined on the basis of this signal as a sampling signal. The reset voltage can be switched in accordance with the determination result before signal charge transfer. In this case, saturation determination can be performed in the sensor chip.

Additionally, before signal charge accumulation, a signal accumulated in a short accumulation period is transferred from the photodiode PD to the FD region. This signal is held on the FD region during the accumulation period. Before reading the signal charges, the signal held on the FD region is read out as a sampling signal, and saturation is determined. The reset voltage is switched on the basis of the determination result. In this case, saturation determination can be performed in the sensor chip.

The structure of an area sensor having the above-described pixel cells arrayed in a matrix will be described next.

Figure 44:
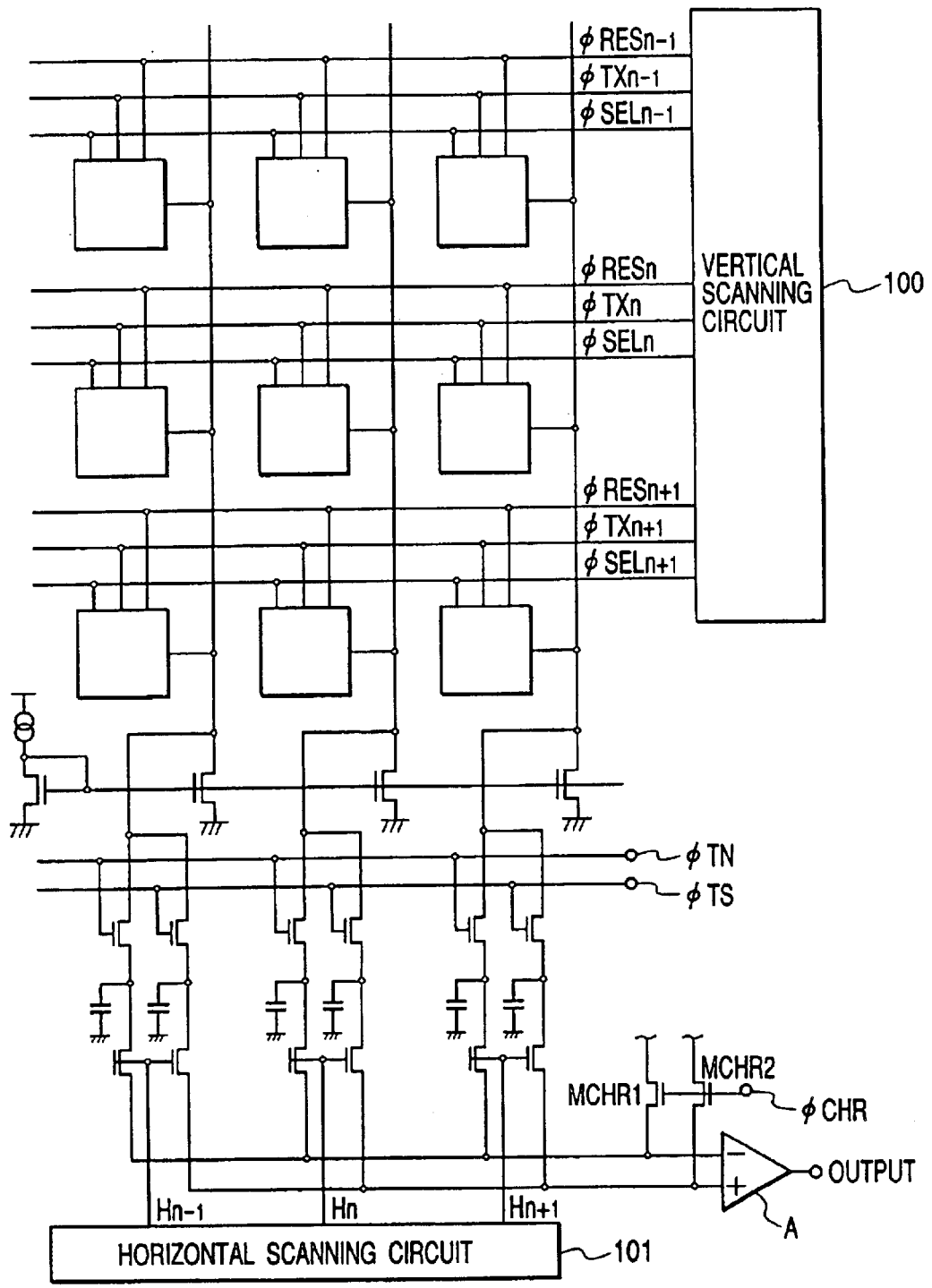
FIG. 44 is a schematic view showing the structure of another area sensor.

FIG. 44 is a schematic view showing the structure of the area sensor. As shown in FIG. 44, rows of pixel cells arrayed in a matrix are scanned by a vertical scanning circuit 100. Signals φRES, φTX, and φSEL are sent in units of rows. Noise and sensor signals are output to the vertical output lines and accumulated in noise signal accumulation capacitances and sensor signal accumulation capacitances, which are connected to the vertical output lines via switching MOS transistors, in units of rows. The noise signals and sensor signals accumulated in the capacitance are scanned by a horizontal scanning circuit 101 in units of columns. A noise signal N and sensor signal S are sequentially sent to the inverting input terminal (−) and noninverting input terminal (+) of a differential amplifier A in units of columns through the horizontal output lines. The differential amplifier A executes subtraction to obtain the signal S−N for each pixel. MOS transistors MCHR1 and MCHR2 for resetting the horizontal output lines to predetermined potentials are controlled by a signal φCHR. Signals φTN and φTS control the switching MOS transistors for transferring the noise and sensor signals to the capacitances.

Figure 45:
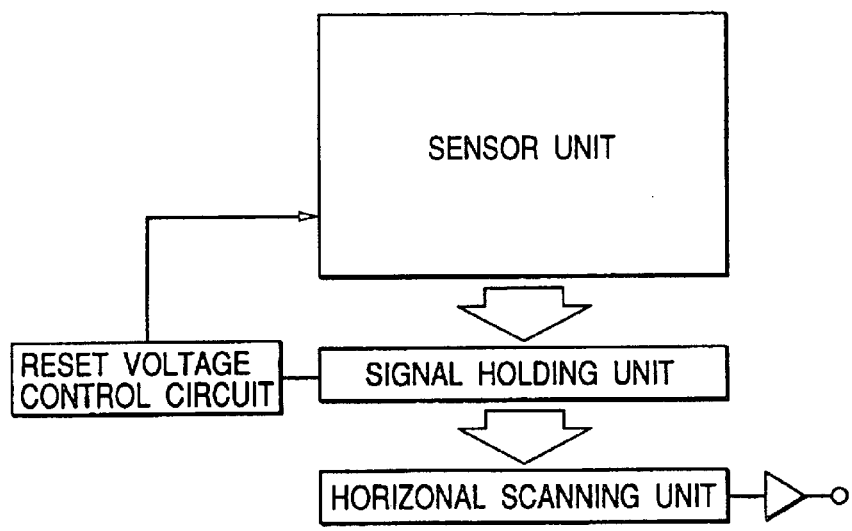
FIG. 45 is a block diagram showing a solid-state image pickup apparatus according to the 11th embodiment of the present invention.
Figure 46:
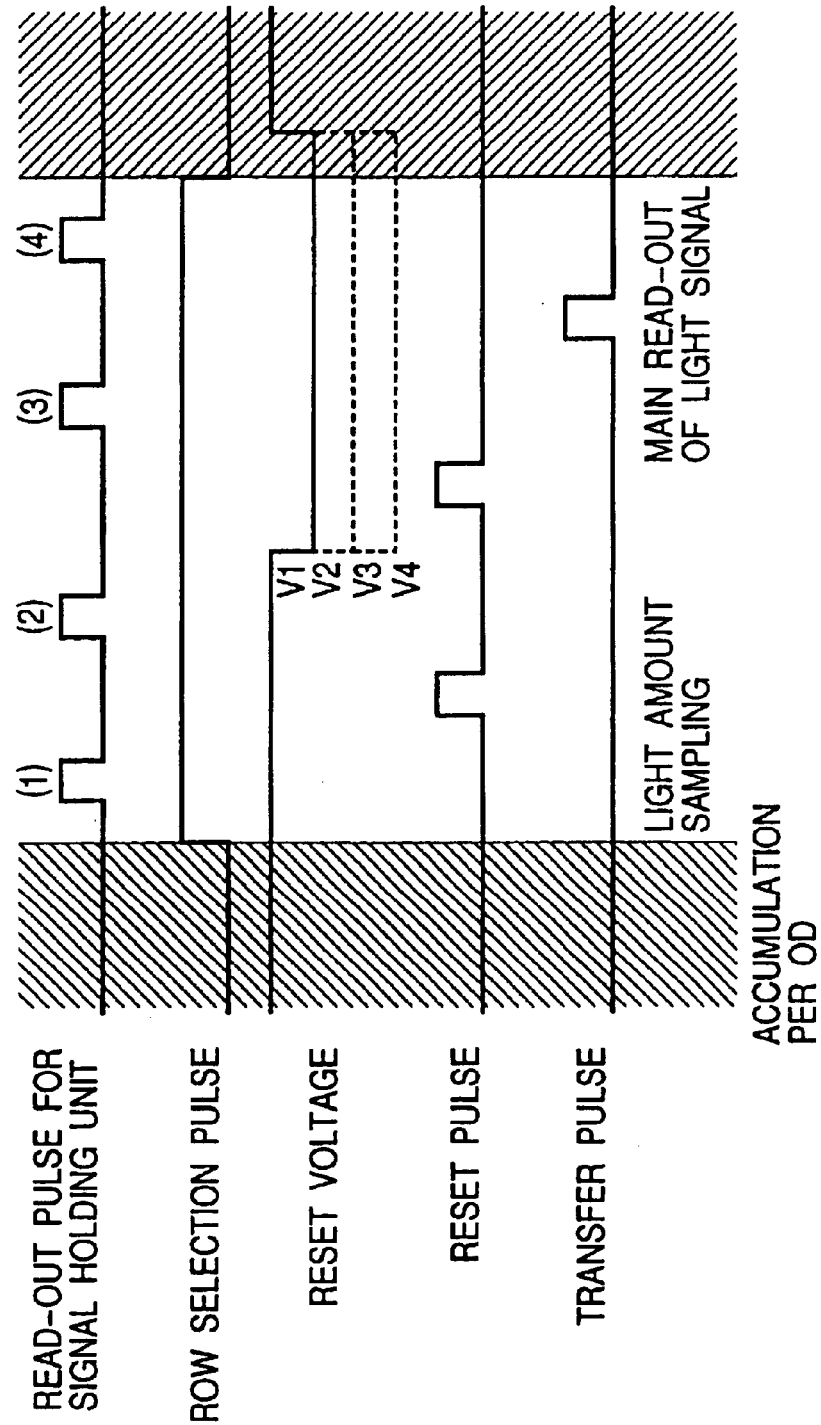
FIG. 46 is a timing chart showing the operation of the solid-state image pickup apparatus of the 11th embodiment.

FIG. 45 is a block diagram showing the arrangement of a solid-state image pickup apparatus according to the 11th embodiment of the present invention. FIG. 46 is a timing chart showing the operation of the solid-state image pickup apparatus.

In this embodiment, signals are read out by the following read-out method using a circuit which temporarily holds, in a signal holding unit, a noise signal from the same sensor unit as in the above-described embodiments and a noise signal +optical signal and then reads out the signals.

(1) As shown in FIG. 46, the reset switch (reset MOS transistor MRES) is turned off during the accumulation period before the signal read-out.

(2) Before reading the noise signal, a light amount sampling signal as a signal corresponding to the incident light amount accumulated in the FD region is read out ((1) in FIG. 46). As this signal, an optical signal entering the FD region is used. In the CCD, such an optical signal is prevented by layout or light shielding. In this embodiment, however, this optical signal is actively used to obtain the light amount sampling signal. When the upper portion of the FD region is opened to receive a larger signal, as needed, a larger sampling signal can be obtained.

(3) After the reset switch is turned on/off to reset the FD region, the noise signal is read out ((2) in FIG. 46).

(4) Using the signal (1) or signals (1) and (2) in FIG. 46, the incident light amount is determined in the reset voltage control circuit, and an appropriate reset voltage is set in accordance with the determination result.

(5) The reset voltage determined in (4) is set to reset the FD region again. Of voltages V1 to V4 shown in FIG. 46, the voltage V2 is selected as the reset voltage.

(6) The noise signal is read out after resetting ((3) in FIG. 46).

(7) The transfer switch (transfer transistor MTX) is turned on/off by a transfer pulse to transfer signal charges from the photodiode to the FD region and read out the noise +optical signal ((4) in FIG. 46). The main read-out of an image signal is performed using the signals (3) and (4) in FIG. 46.

As described above, in this embodiment, the sensitivity is controlled by the reset voltage in accordance with the light amount using the sampling signal, thereby obtaining a variety of image signals.

The solid-state image pickup apparatuses of the above-described eighth to 11th embodiments can be used not only for an area sensor but also for a line sensor.

As described above, according to the eighth to 11th embodiments, the sensitivity can be changed in correspondence with the signal charges accumulated in the photoelectric conversion unit, and a signal with wide dynamic range can be obtained.

The sensitivity can be switched by appropriately changing the reset voltage.

For this reason, a signal having high sensitivity but narrow dynamic range and a signal having low sensitivity but wide dynamic range can be selectively output, as needed. Hence, the solid-state image pickup apparatuses of the eighth to 11th embodiments can be used for, e.g., back light correction.

FIG. 48 is a block diagram showing, as the 12th embodiment of the present invention, a video camera apparatus using one of the solid-state image pickup apparatuses of the first to sixth and eighth to 11th embodiments.

Referring to FIG. 48, the video camera apparatus has a lens system 1, iris 2, motors 3, 5, and 7, magnification lens driving unit 4 for controlling the motor 3, iris mechanism driving unit 6 for controlling the motor 5 to drive the iris 2, and focus compensation lens driving unit 8 for controlling the motor 7. As a solid-state image pickup element 9 for photoelectrically converting an optical signal input from the lens system 1, the solid-state image pickup apparatus of this embodiment shown in FIG. 18 is used. A signal (S2−N1) or signal (S1−N2) is output in accordance with the output selection signal from a microcomputer 15. The apparatus also has a CDS/AGC (correlation double sampling/automatic gain control) 10, and A/D converter 11. A camera signal processing circuit 12 has a Y/C separation circuit 12a, luminance signal processing circuit 12b, chrominance signal processing circuit 12c, chrominance suppression circuit 12d, digital output conversion circuit 12e, and saturated pixel discrimination circuit 12f. The saturated pixel discrimination circuit 12f determines a saturated pixel on the basis of the luminance and chrominance signals. The saturated pixel determination result is input to the microcomputer 15, and the output selection signal is output on the basis of the determination result. The microcomputer 15 controls the magnification lens driving unit 4, iris mechanism driving unit 6, and focus compensation lens driving unit 8 on the basis of the signal from the camera signal processing circuit 12.

The output from the camera signal processing circuit 12 is sent to a monitor unit 14 through a digital decoder and D/A converter 13 for image display and also sent to a VTR.

Figure 49:
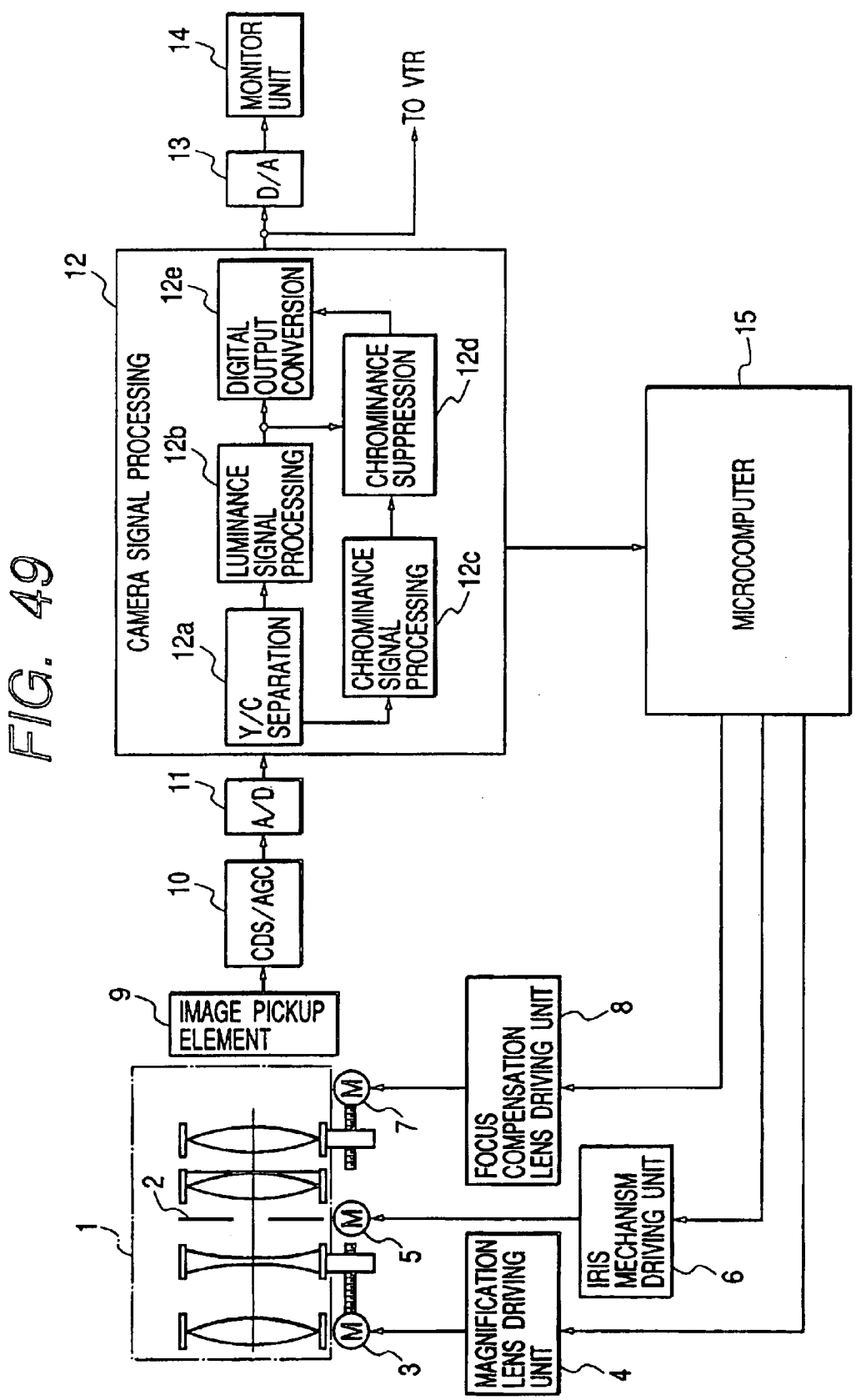
FIG. 49 is a block diagram showing a conventional video camera apparatus.

FIG. 49 is a block diagram showing a conventional video camera apparatus. This apparatus is different from this embodiment in that the saturated pixel discrimination circuit 12f is not arranged, and no output selection signal is output.

Many widely different embodiments of the present invention may be constructed without departing from the spirit and scope of the present invention. It should be understood that the present invention is not limited to the specific embodiments described in the specification, except as defined in the appended claims.

What is claimed is:

1. A solid-state image pickup apparatus comprising:
   a photoelectric conversion unit;
   a transfer unit for transferring signal charges from said photoelectric conversion unit;
   a capacitance unit for holding the transferred signal charges; and
   an amplification unit for outputting a signal corresponding to the signal charges held by said capacitance unit,
   wherein said capacitance unit includes a first capacitance value and an additive capacitance unit for adding a capacitance to said capacitance unit to increase the first capacitance value to obtain a second capacitance value, and
   wherein a signal read-out from said amplification unit has a first read-out mode in which a signal is read out while holding the signal charges in said capacitance unit and said additive capacitance unit, and a second read-out mode in which a signal is read out while holding the signal charges in said capacitance unit.

2. An apparatus according to claim 1, further comprising at least one different additive capacitance unit for further adding a capacitance to said capacitance unit and said additive capacitance unit,
   wherein read modes in which a signal is read out from said amplification unit while holding the signal charges in said capacitance unit in correspondence with each of capacitance values obtained by adding said different additive capacitance unit to each of said capacitance unit and said additive capacitance unit are prepared in number corresponding to the number of different additive capacitance units.

3. A solid-state image pickup apparatus comprising:
a photoelectric conversion unit;
a capacitance unit for holding signal charges transferred from said photoelectric conversion unit;
a transfer field effect transistor for transferring the signal charges from said photoelectric conversion unit and adding a capacitance formed by a channel to said capacitance unit to increase a capacitance value; and
an amplification unit for outputting a signal corresponding to the signal charges held by said capacitance unit or the signal charges held by said capacitance unit and the capacitance of said transfer field effect transistor,
wherein a signal read-out from said amplification unit has a first read-out mode in which a signal is read out while holding the signal charges in said capacitance unit and the capacitance of said transfer field effect transistor, and a second read-out mode in which a signal is read out while holding the signal charges in said capacitance unit.

4. A solid-state image pickup apparatus comprising:
a photoelectric conversion unit;
a first and a second transfer unit for transferring signal charges from said photoelectric conversion unit;
a first capacitance unit, inserted between said first transfer unit and said second transfer unit for holding the transferred signal charges;
a second capacitance unit, arranged on an output side of said second transfer unit, for holding the transferred signal charges; and
an amplification unit for outputting a signal corresponding to the signal charges held by said first and second capacitance unit or the signal charges held by said second capacitance unit,
wherein a signal read-out from said amplification unit has a first read-out mode in which a signal is read out while holding the signal charges in said first and second capacitance units, and a second read-out mode in which a signal is read out while holding the signal charges in said second capacitance unit.

5. An apparatus according to claim 1, further comprising an adding unit for outputting signals in the respective read-out modes.

6. An apparatus according to claim 3, further comprising an adding unit for outputting signals in the respective read-out modes.

7. An apparatus according to claim 4, further comprising an adding unit for outputting signals in the respective read-out modes.

8. A solid-state image pickup apparatus comprising:
a photoelectric conversion unit;
a transfer unit for transferring signal charges from said photoelectric conversion unit;
a capacitance unit for holding the transferred signal charges; and
an amplification unit for outputting a first signal without holding any signal charges in said capacitance unit and outputting a second signal corresponding to the signal charges while keeping the signal charges held by said capacitance unit,
wherein said capacitance unit includes a first capacitance value and an additive capacitance unit for adding a capacitance to said capacitance unit to increase the first capacitance value to obtain a second capacitance value, and
wherein a first signal read-out from said amplification unit has a first non-holding read-out mode in which a signal is read out from said capacitance unit without holding any signal charges, and a second non-holding read-out mode in which a signal is read out from said capacitance unit and said additive capacitance unit without holding any signal charges, and
a second signal read-out from said amplification unit has a first holding read-out mode in which a signal is read out while keeping the signal charges held by said capacitance unit, and a second holding read-out mode in which a signal is read out while keeping the signal charges held by said capacitance unit and said additive capacitance unit.

9. An apparatus according to claim 8, further comprising at least one different additive capacitance unit for further adding a capacitance to said capacitance unit and said additive capacitance unit,
wherein non-holding read-out modes in which a signal is read out from said amplification unit without holding any signal charges in said capacitance unit in correspondence with each of capacitance values obtained by adding said different additive capacitance unit to each of said capacitance unit and said additive capacitance unit, and holding read-out modes in which a signal is read out from said amplification unit while keeping the signal charges held by said capacitance unit in correspondence with each of capacitance values obtained by adding said different additive capacitance unit to each of said capacitance unit and said additive capacitance unit are prepared in number corresponding to the number of different additive capacitance units.

10. A solid-state image pickup apparatus comprising:
a photoelectric conversion unit;
a capacitance unit for holding signal charges transferred from said photoelectric conversion unit;
a transfer field effect transistor for transferring the signal charges from said photoelectric conversion unit and adding a capacitance formed by a channel to said capacitance unit to increase a capacitance value; and
an amplification unit for outputting a first signal without holding any signal charges in said capacitance unit and outputting a second signal corresponding to the signal charges held by said capacitance unit or the signal charges held by said capacitance unit and the capacitance of said transfer field effect transistor,
wherein a first signal read-out from said amplification unit has a non-holding read-out mode in which a signal is read out from said capacitance unit without holding any signal charges, and
a second signal read-out from said amplification unit has a first holding read-out mode in which a signal is read out while keeping the signal charges held by said capacitance unit and the capacitance of said transfer field effect transistor, and a second holding read-out mode in which a signal is read out while keeping the signal charges held by said capacitance unit.

11. A solid-state image pickup apparatus comprising:
a photoelectric conversion unit;
a first and a second transfer unit for transferring signal charges from said photoelectric conversion unit;
a first capacitance unit, inserted between said first transfer unit and said second transfer unit, for holding the transferred signal charges;

a second capacitance unit, arranged on an output side of said second transfer unit, for holding the transferred signal charges; and an amplification unit for outputting a first signal without holding any signal charges in said first and second capacitance units or said second capacitance unit and outputting a second signal corresponding to the signal charges held by said first and second capacitance units or said second capacitance unit, wherein a first signal read-out from said amplification unit has a first non-holding read-out mode in which a signal is read out from said first and second capacitance units without holding any signal charges, and a second non-holding read-out mode in which a signal is read out from said second capacitance unit without holding any signal charges, and a second signal read-out from said amplification unit has a first holding read-out mode in which a signal is read out while keeping the signal charges held by said first and second capacitance units, and a second holding read-out mode in which a signal is read out while keeping the signal charges held by said second capacitance unit.

12. An apparatus according to claim 8, further comprising a first addition unit for adding output signals in the respective non-holding read-out modes, a second addition unit for adding output signals in the respective holding read-out modes, and a subtraction unit for subtracting an output from said first addition unit from an output from said second addition unit.

13. An apparatus according to claim 10, further comprising a first addition unit for adding output signals in the respective non-holding read-out modes, a second addition unit for adding output signals in the respective holding read-out modes, and a subtraction unit for subtracting an output from said first addition unit from an output from said second addition unit.

14. An apparatus according to claim 11, further comprising a first addition unit for adding output signals in the respective non-holding read-out modes, a second addition unit for adding output signals in the respective holding read-out modes, and a subtraction unit for subtracting an output from said first addition unit from an output from said second addition unit.

15. An apparatus according to claim 8, further comprising a subtraction unit for subtracting an output signal in the read-out mode from an output signal in the holding read-out mode when the capacitance values are equal or substantially equal in correspondence with the number of capacitance values varying.

16. An apparatus according to claim 10, further comprising a subtraction unit for subtracting an output signal in the read-out mode from an output signal in the holding read-out mode when the capacitance values are equal or substantially equal in correspondence with the number of capacitance values varying.

17. An apparatus according to claim 11, further comprising a subtraction unit for subtracting an output signal in the read-out mode from an output signal in the holding read-out mode when the capacitance values are equal or substantially equal in correspondence with the number of capacitance values varying.

18. An apparatus according to claim 1, wherein said additive capacitance unit or said additive capacitance unit and said different additive capacitance unit comprise variable capacitive elements electrically connected in parallel to said capacitance unit.

19. An apparatus according to claim 8, wherein said additive capacitance unit or said additive capacitance unit and said different additive capacitance unit comprise variable capacitive elements electrically connected in parallel to said capacitance unit.

20. An apparatus according to claim 8, wherein the order of the first non-holding read-out mode and the second non-holding read-out mode is the same as that of the first holding read-out mode and the second holding read-out mode.

21. An apparatus according to claim 11, wherein the order of the first non-holding read-out mode and the second non-holding read-out mode is the same as that of the first holding read-out mode and the second holding read-out mode.

22. A solid-state image pickup apparatus using, as an area sensor, said solid-state image pickup apparatus of any one of claims 1 to 21.

23. A solid-state image pickup apparatus using, as a line sensor, said solid-state image pickup apparatus of any one of claims 1 to 21.

24. A signal read-out method for a solid-state image pickup apparatus which holds, in a capacitance unit, signal charges generated by a photoelectric conversion unit and outputs a signal corresponding to the signal charges held by the capacitance unit from an amplification unit, said method comprising:

a first read-out mode in which a signal is output from the amplification element while holding the signal charges generated by the photoelectric conversion unit in the capacitance unit set at a first capacitance value; and a second read-out mode in which, after said first read-out mode, the capacitance value of the capacitance unit is changed from the first capacitance value to a second capacitance value, and a signal corresponding to the signal charges held by the capacitance unit set at the second capacitance value is output from the capacitance unit, wherein at least one read-out mode in which, after the second read-out mode, the capacitance value of the capacitance unit is changed from the second capacitance value to an arbitrary capacitance value, and a signal corresponding to the signal charges held by the capacitance unit set at the arbitrary capacitance value is output from the amplification unit.

25. A signal read-out method for a solid-state image pickup apparatus, comprising:

a holding read-out mode in which a signal corresponding to signal charges generated by a photoelectric conversion unit is output from an amplification unit while keeping the signal charges held by a capacitance unit; and a non-holding read-out mode in which a signal is output from the amplification unit without holding any signal charges in the capacitance unit, wherein said holding read-out mode has a first holding read-out mode in which a signal is output from the amplification unit while keeping the signal charges held by the capacitance unit set at a first capacitance value, and a second holding read-out mode in which a signal is output from the amplification unit while keeping the signal charges held by the capacitance unit whose capacitance value is set at a second capacitance value different from the first capacitance value, and wherein said non-holding read-out mode has a first non-holding read-out mode in which a signal is output from the amplification unit without holding any signal charges in the capacitance unit set at the first capacitance value, and a second non-holding read-out mode in which a signal is output from the amplification unit without holding any signal charges in the unit whose capacitance value is set at the second capacitance value different from the first capacitance value, wherein at least one holding read-out mode in which the capacitance value of the capacitance unit is changed from the second capacitance value to an arbitrary capacitance value, and a signal is output from the amplification unit while keeping the signal charges held by the capacitance unit set at the arbitrary capacitance value, and wherein at least one non-holding read-out mode in which the capacitance value of the capacitance unit is changed from the second capacitance value to an arbitrary capacitance value, and a signal is output from the amplification unit without holding any signal charges in the capacitance unit set at the arbitrary capacitance value.

26. A solid-state image pickup apparatus including a plurality of pixels, each pixel comprising:

a photoelectric conversion unit;

a holding unit for holding a signal from said photoelectric conversion unit;

a read-out unit for reading out the signal held by said holding unit; and a capacitance changing unit for changing a capacitance value of said holding unit; and a control unit having a first mode in which a signal is read out from said read-out unit while keeping said holding unit set at a first capacitance value by said capacitance changing unit, and a second mode in which a signal is read out from said read-out unit while keeping said holding unit set at a second capacitance value by said capacitance changing unit.

27. An apparatus according to claim 26, further comprising an addition unit for adding the signal read out in the first mode and the signal read out in the second mode.

28. A solid-state image pickup apparatus comprising:

a photoelectric conversion unit; and a charge/voltage conversion unit for converting signal charges transferred from said photoelectric conversion unit into a signal voltage, wherein said charge/voltage conversion unit comprises a plurality of capacitances having different dependences on voltage, and wherein said charge/voltage conversion unit comprises an impurity diffusion region and a MOS structure unit, and the plurality of capacitances having different dependences on voltage comprise a capacitance formed in the impurity diffusion region and a capacitance formed in said MOS structure unit.

29. An apparatus according to claim 28, wherein said charge/voltage conversion unit comprises an impurity diffusion region and a buried semiconductor junction portion, and the plurality of capacitances having different dependences on voltage comprise a capacitance formed in the impurity diffusion region and a capacitance formed in said buried semiconductor junction portion.

30. An apparatus according to claim 29, wherein the dependence of the capacitance formed in the buried semiconductor junction portion on voltage is controlled by an impurity concentration or depth of a semiconductor region of one conductivity type of the buried semiconductor junction portion.

31. An apparatus according to claim 30, wherein the dependence of the capacitance formed in the buried semiconductor junction portion on voltage is controlled by a width of a semiconductor region of one conductivity type of the buried semiconductor junction portion.

32. A solid-state image pickup apparatus comprising:

a photoelectric conversion unit;

a charge/voltage conversion unit for converting signal charges transferred from said photoelectric conversion unit into a signal voltage, wherein said charge/voltage conversion unit comprises a plurality of capacitances having different dependences on voltage;

a reset unit for applying a reset voltage to reset said charge/voltage conversion unit, wherein a charge/voltage conversion efficiency of said charge/voltage conversion unit is controlled by controlling a voltage value of the reset voltage; and a sampling unit for sampling a light amount incident on said photoelectric conversion unit, wherein the reset voltage is set in accordance with a sampling signal from said sampling unit.

33. An apparatus according to claim 32, wherein the sampling signal is a signal one frame ahead.

34. An apparatus according to claim 32, wherein the sampling signal is one of an overflow drain signal and a smear signal.

35. An apparatus according to claim 32, wherein before an accumulation period of the signal charges, second signal charges accumulated in an accumulation period shorter than the accumulation period are transferred to the impurity diffusion region, and the second signal charges are used as the sampling signal.

* * * * *

UNITED STATES PATENT AND TRADEMARK OFFICE
CERTIFICATE OF CORRECTION

PATENT NO. : 6,850,278 B1
DATED : February 1, 2005
INVENTOR(S) : Katsuhito Sakurai et al.

It is certified that error appears in the above-identified patent and that said Letters Patent is hereby corrected as shown below:

Drawings,
Sheet 32, FIG. 45, "HORIZONAL" should read -- HORIZONTAL --.
Sheet 33, FIG. 46, "PER OD" should read -- PERIOD --.

Column 9,
Line 65, "S2) (N1+N2)." should read -- S2)-(N1+N2). --.

Column 23,
Line 28, "unit; and" should read -- unit; --.

Signed and Sealed this

Seventh Day of June, 2005

JON W. DUDAS
*Director of the United States Patent and Trademark Office*